(12) United States Patent
Da Silva et al.

(10) Patent No.: US 12,568,412 B2
(45) Date of Patent: Mar. 3, 2026

(54) SYSTEMS AND METHODS FOR MASTER NODE-INITIATED CONDITIONAL PRIMARY SECONDARY CELL CHANGE WITH SECONDARY NODE CHANGE

(71) Applicant: Telefonaktiebolaget LM Ericsson (PUBL), Stockholm (SE)

(72) Inventors: Icaro Leonardo Da Silva, Solna (SE); Cecilia Eklöf, Täby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 426 days.

(21) Appl. No.: 18/040,276

(22) PCT Filed: Aug. 6, 2021

(86) PCT No.: PCT/IB2021/057267
§ 371 (c)(1),
(2) Date: Feb. 2, 2023

(87) PCT Pub. No.: WO2022/029709
PCT Pub. Date: Feb. 10, 2022

(65) Prior Publication Data
US 2024/0040451 A1     Feb. 1, 2024

Related U.S. Application Data

(60) Provisional application No. 63/062,322, filed on Aug. 6, 2020.

(51) Int. Cl.
| | |
|---|---|
| *H04W 36/00* | (2009.01) |
| *H04W 36/38* | (2009.01) |
| *H04W 76/20* | (2018.01) |

(52) U.S. Cl.
CPC ............... *H04W 36/00837* (2018.08); *H04W 36/00698* (2023.05); *H04W 36/38* (2013.01); *H04W 76/20* (2018.02)

(58) Field of Classification Search
CPC ..... H04W 36/00837; H04W 36/00698; H04W 36/38; H04W 76/20; H04W 76/15
See application file for complete search history.

(56) References Cited

U.S. PATENT DOCUMENTS

| | | | |
|---|---|---|---|
| 2023/0103163 A1* | 3/2023 | Xu | H04W 80/02 370/331 |
| 2024/0314645 A1* | 9/2024 | Hwang | H04W 36/00698 |

OTHER PUBLICATIONS

CATT (CATT: Draft stage-2 CR for Conditional PSCell Addition/Change 3GPP Draft; R2-1915985, Nov. 8, 2019 (Nov. 8, 2019)).*

(Continued)

*Primary Examiner* — Lakeram Jangbahadur

(57) ABSTRACT

A method performed by a network node operating as a Master Node (MN) for conditional Primary Secondary Cell Change (CPC) includes sending, to a target candidate secondary node (SN) an SN Addition Request message and receiving, from the target candidate SN, an SN Addition Request Acknowledge message comprising a RRC Reconfiguration message (RRCReconfiguration**) for a target candidate cell. The network node sends, to a wireless device, an RRC Reconfiguration message (RRCReconfiguration), which includes at least one conditional reconfiguration for the CPC. The conditional reconfiguration includes: another RRC Reconfiguration message (RRCReconfiguration*); at least one execution condition for the CPC; and a conditional reconfiguration identity associated with the CPC for the target candidate cell. The RRCReconfiguration* includes (Continued)

the RRCReconfiguration**. The network node receives, from the wireless device, a first reconfiguration complete message (RRCReconfigurationComplete) and a second RRCReconfigurationComplete message (RRCReconfigurationComplete*), which includes another RRCReconfigurationComplete message (RRCReconfigurationComplete**).

20 Claims, 12 Drawing Sheets

(56)                  References Cited

OTHER PUBLICATIONS

CATT089 (CATT (Rapporteur): discussion [108#67] Report on email [NR Mob] Resolving open issues in CPAC and creating TP (CATT) 3GPP Draft; R2-2002089, (Feb. 21, 2020)).*
CATT300 (CATT (Rapporteur): "Report on Email Discussion, Open Issues Conditional PSCell Addition/Change (CATT)", 3GPP Draft; R2-1916300, Nov. 23, 2019, (2019-11-2023).*
ETSI 138 331 v16.1.0; 5G; NR; Radio Resource Control (RRC); Protocol specification (3GPP TS 38.331 version 16.1.0 Release 16)—Jul. 2020.
PCT Notification of Transmittal of the International Search Report and the Written Opinion of the International Searching Authority, or the Declaration issued for International application No. PCT/IB2021/057267—Nov. 30, 2021.
3GPP TSG-RAN2 Meeting #108, Reno, USA; Change Request, 37.340 CR-rev-Current Version: 15.7.0; Title: Draft stage-2 CR for Conditional PSCell Addition/Change (R2-1915985)—Nov. 18-22, 2019.
3GPP TSG-RAN WG2 Meeting #108; Reno, USA; Source: CATT (Rapporteur); Title: Report on Email Discussion [107b#52] [NR MobE] Open Issues Conditional PSCell Addition/Change (CATT) (R2-1916300)—Nov. 18-22, 2019.
3GPP TSG-RAN WG2 Meeting #109 electronic; Elbonia; Source: CATT (Rapporteur); Title: Report on email discussion [108#67] [NR Mob] Resolving Open issues in CPAC and creating TP (CATT) (R2-2002089)—Feb. 24-Mar. 6, 2020.
3GPP TSG-RAN WG2 #113e; Electronic meeting; Source: Ericsson; Title: Conditional PSCell Change/Addition (R2-2101270)—Jan. 25-Feb. 5, 2021.
3GPP TSG-RAN WG2 #115-e; Electronical meeting; Source: Ericsson; Title: UE procedures and signalling for CPAC (R2-2108113)—Aug. 9-27, 2021.

* cited by examiner

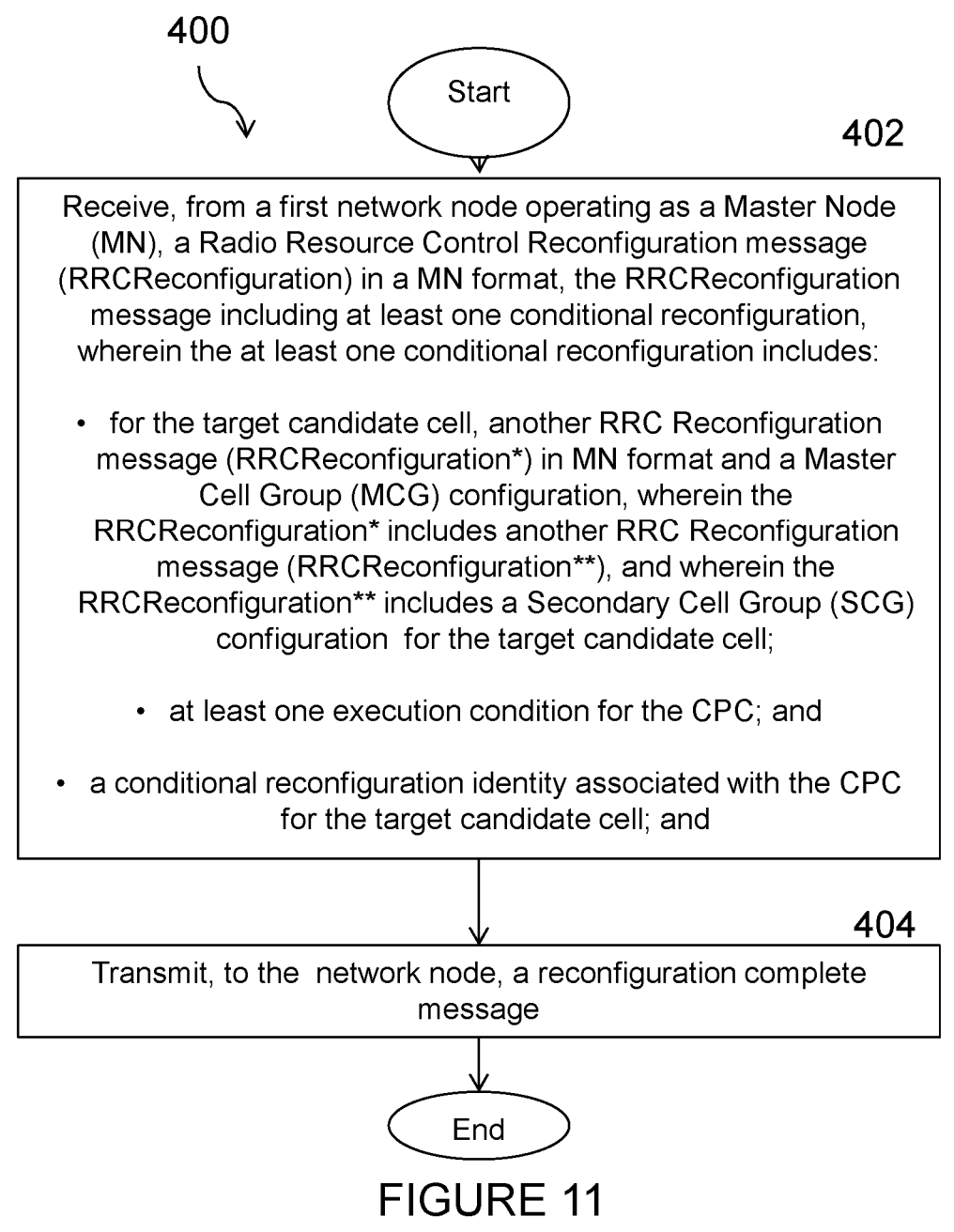

400

402

Start

Receive, from a first network node operating as a Master Node (MN), a Radio Resource Control Reconfiguration message (RRCReconfiguration) in a MN format, the RRCReconfiguration message including at least one conditional reconfiguration, wherein the at least one conditional reconfiguration includes:

- for the target candidate cell, another RRC Reconfiguration message (RRCReconfiguration*) in MN format and a Master Cell Group (MCG) configuration, wherein the RRCReconfiguration* includes another RRC Reconfiguration message (RRCReconfiguration), and wherein the RRCReconfiguration includes a Secondary Cell Group (SCG) configuration for the target candidate cell;

- at least one execution condition for the CPC; and

- a conditional reconfiguration identity associated with the CPC for the target candidate cell; and

404

Transmit, to the network node, a reconfiguration complete message

End

FIGURE 11

SYSTEMS AND METHODS FOR MASTER NODE-INITIATED CONDITIONAL PRIMARY SECONDARY CELL CHANGE WITH SECONDARY NODE CHANGE

PRIORITY

This nonprovisional application is a U.S. National Stage Filing under 35 U.S.C. § 371 of International Patent Application Serial No. PCT/IB2021/057267 filed Aug. 6, 2021 and entitled "SYSTEMS AND METHODS FOR MASTER NODE-INITIATED CONDITIONAL PRIMARY SECONDARY CELL CHANGE WITH SECONDARY NODE CHANGE" which claims priority to U.S. Provisional Patent Application Ser. No. 63/062,322 filed Aug. 6, 2020 both of which are hereby incorporated by reference in their entirety.

TECHNICAL FIELD

The present disclosure relates, in general, to wireless communications and, more particularly, systems and methods for master node-initiated conditional primary secondary cell change with secondary node change.

BACKGROUND

Two new work items for mobility enhancements in Long-Term Evolution (LTE) and New-Radio (NR) have started in $3^{rd}$ Generation Partnership Project (3GPP) in Release 16. The main objectives of the work items are to improve the robustness at handover and to decrease the interruption time at handover.

One problem related to robustness at handover is that the handover command (HO Command) (RRCConnectionReconfiguration with mobilityControlInfo and RRCReconfiguration with a reconfigurationWithSync field) is normally sent when the radio conditions for the user equipment (UE) are already quite bad. That may lead to the HO Command not reaching the UE in time if the message is segmented or there are retransmissions.

Different solutions have been discussed to increase mobility robustness in LTE and NR. One solution for NR is called "conditional handover" or "early handover command." In order to avoid undesired dependence on the serving radio link upon the time (and radio conditions) where the UE should execute the handover, Radio Resource Control (RRC) signaling for the handover to the UE should be provided earlier. To achieve this, it is possible to associate the HO command with a condition (e.g., based on radio conditions possibly similar to the ones associated to an A3 event, where a given neighbour becomes X db better than target). As soon as the condition is fulfilled, the UE executes the handover in accordance with the provided handover command.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold), which is considered optimal for the handover execution.

FIG. 1 illustrates an example of conditional handover (CHO) execution. More particularly, FIG. 1 illustrates an example with just a serving and a target cell. In practice, there may often be many cells or beams that the UE reported as possible candidates based on its preceding Radio Resource Management (RRM) measurements. The network should then have the freedom to issue conditional handover commands for several of those candidates. The RRCConnectionReconfiguration for each of those candidates may differ, for example, in terms of the HO execution condition (e.g., reference signal (RS) to measure and threshold to exceed) as well as in terms of the random access (RA) preamble to be sent when a condition is met.

While the UE evaluates the condition, it should continue operating per its current RRC configuration (i.e., without applying the conditional HO command). When the UE determines that the condition is fulfilled, it disconnects from the serving cell, applies the conditional HO command and connects to the target cell. These steps are equivalent to the current, instantaneous handover execution.

Conditional handover is described in 3GPP TS 38.300, Ch. 9.2.3.4.

FIG. 2 illustrates the procedure for intra-Application Management Function (AMF)/User Plane Function (UPF) Conditional Handover as taken from 3GPP TS 37.300. As depicted, the steps include:

0/1. Same as step 0, 1 in FIG. 9.2.3.2.1-1 of section 9.2.3.2.1.

2. The source gNB decides to use CHO.

3. The source gNB issues a Handover Request message to one or more candidate gNBs.

4. Same as step 4 in FIG. 9.2.3.2.1-1 of section 9.2.3.2.1.

5. The candidate gNB sends HANDOVER REQUEST ACKNOWLEDGE message including configuration of CHO candidate cell to the source gNB.

6. The source gNB sends an RRCReconfiguration message to the UE, containing the configuration of CHO candidate cell(s) and CHO execution condition(s).

7. UE sends an RRCReconfigurationComplete message to the source gNB.

8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

The UE can be configured with Dual Connectivity, communicating both via a Master Cell Group (MCG) and a Secondary Cell Group (SCG). When the UE is configured with dual connectivity, the UE is configured with two Medium Access Control (MAC) entities: one MAC entity for the MCG and one MAC entity for the SCG.

In Multi-Radio Dual Connectivity (MR-DC) the cell groups are located in two different logical nodes different Next-Generation Radio Access Network (NG-RAN) nodes), possibly connected via a non-ideal backhaul, one providing NR access and the other one providing either Evolved Universal Terrestrial Radio Access (E-UTRA) or NR access. One node acts as the Master Node (MN) and the other as the Secondary Node (SN). The MN and SN are connected via a network interface and at least the MN is connected to the core network.

The operation in MR-DC involves different reconfiguration procedures, like secondary node addition, secondary node modification, secondary node release, and secondary node change.

The signaling flow for MN-initiated SN change, leading to a PSCell Change (PC), is described in 3GPP TS 37.340. Therein, the UE is operating in MR-DC (i.e., connected to an MN and a Source SN (S-SN)) and the MN decides to move the UE to a Target SN (T-SN), possibly based on reported measurements on S-SN and/or T-SN frequencies.

FIG. 3 illustrates an example SN change procedure as initiated by the MN. The MN initiated SN change procedure is used to transfer a UE context from the S-SN to a T-SN and to change the SCG configuration in UE from one SN to another. The Secondary Node Change procedure always involves signalling over MCG Signalling Radio Bearer (SRB) towards the UE.

A solution for Conditional Primary SCell (PSCell) Change (CPC) procedure was standardized in Rel-16. Therein, a UE operating in MR-DC receives in a conditional reconfiguration one or multiple RRC Reconfiguration(s) (e.g., an RRCReconfiguration message) containing an SCG configuration (e.g., an secondaryCellGroup of IE Cell-GroupConfig) with a reconfigurationWithSync that is stored and associated to an execution condition (e.g., a condition like an A3/A5 event configuration)), so that one of the stored messages is only applied upon the fulfillment of the execution condition (e.g., associated with the serving PSCell), upon which the UE would perform PSCell change (in case it finds a neighbour cell that is better than the current SpCell of the SCG).

In Rel-16, CPC will be supported, but in Rel-17 also PSCell Addition will be included (i.e., Conditional PSCell Addition/Change (CPAC)). In Rel-16, only intra-SN SN CPC without MN involvement is standardized. Inter SN PSCell CPC and CPC with MN involvement will be included in Rel-17.

The following agreements relate to the procedure:

1. We will prioritize work in SN-initiated PSCell change for conditional PSCell change.
2. Maintain Rel-15 principle that only one PScell is active at a time even with conditional PScell change.
3. For conditional PScell change, A3/A5 execution condition should be supported.
4. For conditional SN change, the source SN configuration can be used as the reference in generation of delta signalling for the candidate SNs.
5. Both the execution condition and the configuration for the candidate PSCell (as a container) can be included in the RRCReconfiguration message generated by the SN for intra-SN conditional PSCell change initiated by the SN (without MN involvement).
6. SRB1 can be used in all cases. SRB3 may be used to transmit conditional PScell change configuration to the UE for intra-SN change without MN involvement.
7. Limit to intra-SN change without MN involvement (i.e. no MN reconfiguration or decision needed but SRB1 can be used) in Rel-16.

Same as for CHO, the following agreements were aggred to for CPC:

1. Usage of CPAC is decided by the network. The UE evaluates when the condition is valid.
2. Support configuration of one or more candidate cells for CPAC;

a. FFS how many candidate cells (UE and network impacts should be clarified). FFS whether the number of candidate cells for CPAC different from that of CHO.
3. Allow having multiple triggering conditions (using "and") for CPAC execution of a single candidate cell. Only single RS type per CPAC candidate is supported. At most two triggering quantities (e.g. RSRP and RSRQ, RSRP and SINR, etc.) can be configured simultaneously. FFS on UE capability
4. Define an execution condition for conditional PSCell change by the measurement identity which identities a measurement configuration
5. Cell level quality is used as baseline for Conditional NR PSCell change execution condition;
   a. Only single RS type (SSB or CSI-RS) per candidate PSCell is supported for PSCell change.
   b. At most two triggering quantities (e.g. RSRP and RSRQ, RSRP and SINR, etc.) can be configured simultaneously. FFS on UE capability.
   c. TTT is supported for CPAC execution condition (as per legacy configuration)
6. No additional optimizations with multi-beam operation are introduced to improve RACH performance for conditional PSCell change completion with multi-beam operation.
7. For FR1 and FR2, leave it up to UE implementation to select the candidate PSCell if more than one candidate cell meets the triggering condition. UE may consider beam information in this.
8. UE is not required to continue evaluating the triggering condition of other candidate PSCell(s) during conditional SN execution.

Additional agreements relating to CPC from RAN2 #109e include:

1. Similar to CHO, the following applies to CPC-intra-SN configuration
   Reuse the RRCReconfiguration/RRCConnectionReconfiguration procedure to signal CPC-intra-SN configuration to UE.
   The MN is not allowed to alter any content of the configuration from the SN which is carried in an RRC container.
   Multiple candidate PSCells can be sent in either one or multiple RRC messages.
   Use add/mod list+release list to configure multiple candidate PSCells.
   CPC-intra-SN execution condition and/or candidate PSCell configuration can be updated by the SN (i.e. by modifying the existing CPC-intra-SN configuration).
2. Once the CPC-intra-SN procedure is executed successfully, the UE releases all CPC-intra-SN configurations stored on the UE side.
3. Upon the successful completion of conventional PSCell change procedure, the UE releases all CPC-intra-SN configurations.
4. The SCG failure information procedure can be used for CPC-intra-SN procedure failure (due to RLF, T304-like timer expiry or compliance check failure).
5. For Future Study: In case of SRB3, the MN is not informed of CPC-intra-SN execution by the UE.
6. If SRB3 is not configured, the UE first informs the MN that the message has been received. Then the UE needs to provide the CPC complete message to the SN via the MN upon CPC execution.

7. CPC reuses the IE defined for CHO. The field name of the IE could be changed to reflect that the IE is used for both CHO and CPC.

Further agreements relating to CPC from RAN2 #109e include:

S1_1: While executing CPC procedure, the UE continues to receive RRC reconfiguration from the MN. However, the UE should finalise the ongoing CPC execution before processing the RRC message received from the MN (same as in the conventional PSCell change). i.e. legacy behaviour and no specific UE requirement.

S1_2: As in legacy PSCell change, the UE sends RRCReconfigurationComplete to the MN at execution of CPC when no SRB3 is configured and the MN informs the SN. i.e the complete message to MN includes an embedded complete message to the SN.

S1_3: The UE sends RRCReconfigurationComplete to the MN at configuration of CPC when no SRB3 is configured and the MN informs the SN. i.e. the complete message to the MN includes an embedded complete message to the SN.

S1_4. Upon RLF on PCell during the execution of Conditional PSCell change for intra-SN change without MN involvement, the UE supports the Rel-16 MR-DC procedures, i.e. performs connection re-establishment procedure without any fast MCG link recovery.

S1_5: Support of CHO and CPC-intra-SN configuration simultaneously is not considered in Rel-16. Leave it up to the network solution to ensure there is no simultaneous CHO and CPC configuration.

S2_6: Reconfirm the use of SCG failure information upon declaring SCG failure in the procedure of the conditional PSCell change.

S2_7. When the conditional PSCell configuration received over SRB3 is invalid, UE initiates SCG failure information procedure to report to the MN about the SN change failure due to invalid configuration (legacy procedure).

S2_9. Like CHO, UE shall follow the below procedures for handling the T310 and T304 timers during conditional PSCell addition/change procedure for EN-DC, NGEN-DC, NR-DC cases:

UE shall not stop T310 or SN T310 and shall not start T304 when it receives configuration of a CPC-intra-SN The timer T310 (SN only in case of SN Change) is stopped and timer T304-like is started when the UE begins execution of a CPC-intra-SN.

S3_11. UE checks the validity of conditional PSCell change execution criteria configuration immediately on receiving the conditional PSCell change RRC Reconfiguration message, either embedded in the MN RRC message over SRB1 or received over SRB3 (same as CHO).

S3_12. Introduce no specification changes regarding compliance checking of embedded Reconfiguration message containing configuration of conditional PSCell candidate (same as for CHO).

S2_8 UE performs connection re-establishment procedure or actions upon going to RRC_IDLE (legacy procedure) when the conditional PSCell configuration received over SRB1 is invalid. i.e. UE cannot comply with the embedded PSCell configuration for intra-SN Change Additional agreements relating to CPC from RAN2 #109bis-e include:

1. The UE does not inform the MN when CPC execution condition is fulfilled and the UE starts executing CPC, when CPC configuration is provided over SRB3.

2. A threshold parameter is not introduced to determine PCell quality for execution of CPC.

3. Upon transmission of SCG failure information to the network, the UE stops evaluating the CPC execution criteria according to the current CPC configuration until a response is received from the network.

4. Whether the UE continue measurements for candidate PSCells configured for execution condition upon CPC failure is left to the UE implementation.

5. The content of FailureReportSCG for CPC procedure failure should include failureType, measResultFreqList and measuResultSCG-Failure. These parameters are set according to the exiting SCG FailureInformation procedure. (same as legacy)

6. Use ULInformationTransferMRDC instead of RRCReconfigurationComplete message to inform the network of CPC execution when no SRB3 is configured and the MN informs the SN, i.e. ULInformationTransferMRDC message to MN includes an embedded RRCReconfigurationComplete message to the SN. This applies to both NR MN and LTE MN. (change of previous agreement).

Further agreements relating to CPC from RAN2 #109bis-e include:

1. If CPC configuration is not released by network, the UE autonomously releases the stored CPC configuration upon the SCG release.

2. measID and reportConfig associated with CPC config, and measObject(s) only associated to CPC shall be autonomously removed by UE when SCG is released.

3. Support of CPC configuration (CPC condition+CPC reconfiguration) in legacy HO command or CPC configuration in CPC configuration should not be considered in Rel-16.

As described above, in Rel-16 only the case intra-SN case without MN involvement for CPC is supported (i.e., where S-SN and T-SN are the same node in picture 10.5.1-2 from 3GPP TS 37.340). That means that the cell is changed, but both the old and the new cell are in the same node.

There currently exist certain challenges. One problem that the present disclosure addresses relates to a new scenario to be supported in Rel-17, which is when a UE is operating in MR-DC (i.e., having a connection with a MN and a SN) and the UE needs to be configured with an inter-SN, initiated CPC (i.e., when at least one target candidate PSCell in CPC is associated to a target candidate SN (T-SN) that is not the same node as the source SN (S-SN) the UE is connected to). In existing approaches, there is no signaling and associated procedures supporting inter-SN, MN-initiated CPC.

Assuming the existing signaling and procedures for MN-initiated PSCell Change, as defined in Rel-15 as illustrated in FIG. 3, the following problems would exist. First, if the previous procedure is used, the MN would initiate the SN change by requesting the target SN to allocate resources for the UE by means of the SN Addition procedure, possibly including measurement results related to the target SN. A first problem is that only a single target candidate is requested from the MN, which is fine for previous handover scenarios but in the conditional procedure this creates issues, as the MN has some uncertainty on the exact target candidate SN the UE may change to upon CPC execution.

Another problem with previous techniques and procedures is that the MN is triggering the T-SN to prepare for a coming UE within a short time (when the UE receives the RRC Reconfiguration as generated by the T-SN, applies it and perform random access with the SpCell of the SCG associated to the T-SN). However, in CPC, the UE may come (i.e., access the PSCell) with a longer time or may not even come (in case the UE accesses another prepared candidate). That may affect the way the T-SN prepare its resources for the preparation procedure and determine the acceptance of the UE, so that thinking that this is a legacy procedure and timers may be set to a low value. When the UE does not come, the T-SN declares a failure in the procedure while in reality the procedure has not really failed but is simply a conditional procedure. Resource reservation may also be different in the T-SN if the addition is conditional such as, for example, to avoid reserving resources that may never be used.

Yet another problem is that in CPC Rel-16 only SN-initiated intra-SN CPC is supported. That means that the SN builds the SCG RRC message containing the conditional reconfiguration (CPC), to be included by the MN in an nr-SCG field (or equivalent). In an MN-initiated scenario, the SN cannot generate the CPC within an SCG Reconfiguration, at least not with the existing procedures like the legacy MN-initiated SN change.

Still another problem is that in the previous techniques and procedures the MN includes the measurement results related to the target SN received in the MN. However, as in CPC the UE may access that target SN after a longer time, the situation of the cells reported in these measurements from to T-SN may have completely changed upon CPC execution. In other words, the T-SN may have added/changed/released SCG SCell(s) based on measurements that upon execution are not valid any longer so the UE may end up with SCells that it shouldn't, or worse, the UE may release SCell(s) that are in very good conditions.

Additionally, if the previous techniques and procedures are used the MN would trigger step 3*a*. Thus, the MN would have to send the SN Release Request upon the MN having received an SN Addition Request Ack. This is problematic, however, because if that is done for MN-initiated CPC, resources at the S-SN would be released, even before the CPC is executed. From the network perspective, the S-SN would assume the UE is not in MR-DC any longer or has already executed CPC.

Further, if the previous techniques and procedures are used, the MN would initiate the release of the source SN resources including a Cause indicating SCG mobility if the allocation of target SN resources would have been successful. And, if data forwarding would be needed, the MN would provide data forwarding addresses to the source SN. The reception of the SN Release Request message would have triggered the source SN to stop providing user data to the UE. This is problematic because if the MN confirms the release of S-SN resources upon receiving the complete message from the UE, S-SN resources would be released even though UE is still monitoring CPC conditions for a possible target candidate SN and the UE would stop operating in MR-DC, which is not desired in this scenario of inter-SN CPC during preparation.

Additionally, if the previous techniques and procedures are used, the MN would trigger the UE to apply the new configuration. The MN would indicate the new configuration to the UE in the MN RRC reconfiguration message including the target SN RRC reconfiguration message (e.g., within an nr-SCG field/IE defined to include an RRC container). The UE applies the new configuration and sends the MN RRC reconfiguration complete message, including the SN RRC response message for the target SN, if needed. This is problematic because the T-SN creates an SCG configuration (e.g., an RRCReconfiguration**) to be put within an RRCReconfiguration* generated by the MN (in MN format), wherein the RRCReconfiguration* is sent to the UE. The field nr-SCG (or equivalent) is set to RRCReconfiguration**.

Additionally, in MN-initiated CPC that cannot be done otherwise the UE would apply the SCG configuration upon reception which is not intended in CPC.

Assuming an alternative where CPC Rel-16 solution is used is also not possible. The reason is that in legacy CPC Rel-16 only SN initiated intra-SN CPC is supported, thus, the SN provides the whole CPC configuration to the MN, so the MN can just set the nr-SCG to whatever it receives (not the case in MN-initiated CPC, as CPC is not what is provided by the T-SN).

In addition, it is also not clear which node should determine and generate the execution conditions (i.e., exact thresholds and/or exact events A3/A5 associated, quantities, etc.) and create/generate the message with the condition associated to the target candidate SN.

Yet another problem relates to the handling of complete/ack messages from the UE during preparation/execution. In the previous techniques and procedures, a single step is used to acknowledge the compliance of MN/MCG configuration and target SCG/SN configurations, where the UE includes an SCG complete within the RRCReconfigurationComplete message (RRCReconfigurationComplete*(RRCReconfigurationComplete**)). However, it is not clear how that should be done in MN-initiated CPC, as during preparation the T-SN may not have provided a configuration applied or verified at the UE (only upon execution).

Further, if the previous techniques and procedures are used, if the RRC connection reconfiguration procedure is successful the would inform the target SN via SN Reconfiguration Complete message with the included SN RRC response message for the target SN, if received from the UE. However, in Rel-17 for MN-initiated CPC with SN change, the S-SN may be different from the one or more T-SN candidates. Hence, it is not clear to which node which complete message is forwarded, when/if received in MN upon CPC execution. It is particularly unclear how the MN is aware of which target candidate SN the complete message is associated to, in case multiple target candidate cells associated to multiple target candidate SN(s) were configured.

Additionally, if the previous step is used, if the allocation of target SN resource was successful, the MN would confirm the release of the source SN resources. If data forwarding is needed, the MN provides data forwarding addresses to the source SN. If direct data forwarding is used for SN terminated bearers, the MN provides data forwarding addresses as received from the target SN to source SN. Reception of the SgNB Change Confirm message triggers the source SN to stop providing user data to the UE and, if applicable, to start data forwarding. If the RRC connection reconfiguration procedure was successful, the informs the target SN via SgNB Reconfiguration Complete message with the encoded NR RRC response message for the target SN, if received from the UE.

Still another problem relates to data forwarding. Using previous techniques and procedures, data forwarding can be done when the UE is configured to perform PSCell change. However, in CPC, there may be early or late data forwarding. It is not clear when that step is to be performed or, even if it should be performed. For late data forwarding, the S-SN does not know when to send SN STATUS TRANSFER and freeze Packet Data Convergence Protocol (PDCP) before starting data forwarding.

SUMMARY

Certain aspects of the present disclosure and their embodiments may provide solutions to these or other challenges. For example, the present disclosure describes various approaches for configuration of MN initiated inter-SN PSCell Change.

According to certain embodiments, a method by a network node operating as a for CPC includes sending, to a target candidate SN an SN Addition Request message. The SN Addition Request message indicates that the request is for the CPC. The network node receives, from the target candidate SN, an SN Addition Request Acknowledge message comprising a RRC Reconfiguration message (which is referred to herein as RRCReconfiguration) in SN format for a target candidate cell. The RRCReconfiguration includes a SCG configuration. The network node sends, to a wireless device 110, an RRC Reconfiguration message (which is referred to herein as RRCReconfiguration) in a MN format. The RRCReconfiguration message comprises at least one conditional reconfiguration for the CPC. The conditional reconfiguration comprises:

for the target candidate cell, another RRC Reconfiguration message (which is referred to herein as RRCReconfiguration*) in MN format and includes a MCG configuration, wherein the RRCReconfiguration* includes the RRCReconfiguration**; and
at least one execution condition for the CPC; and
a conditional reconfiguration identity associated with the CPC for the target candidate cell;

The network node receives, from the wireless device, a first reconfiguration complete message. The network node also receives, from the wireless device, a second RRCReconfigurationComplete message (which is referred to herein as RRCReconfigurationComplete*) in MN format. The RRCReconfigurationComplete* comprises another RRCReconfigurationComplete message, (which is referred to herein as RRCReconfigurationComplete**) in SN format. The RRCReconfigurationComplete* indicates that the wireless device applied the RRCReconfiguration* upon fulfilment of the execution condition. The RRCReconfiguration-Complete indicates that the wireless device has applied the RRCReconfiguration and executed the CPC. A release of at least one source SN resource is delayed until the RRCReconfigurationComplete* is received by the network node.

According to certain embodiments, a network node operating as a MN for CPC includes processing circuitry configured to send, to a target candidate SN, an SN Addition Request message. The SN Addition Request message indicates that the request is for the CPC. The processing circuitry is configured to receive, from the target candidate SN, an SN Addition Request Acknowledge message comprising a RRC Reconfiguration message (which is referred to herein as RRCReconfiguration) in SN format for a target candidate cell. The RRCReconfiguration includes a SCG configuration. The processing circuitry is configured to send, to a wireless device 110, an RRC Reconfiguration message (which is referred to herein as RRCReconfiguration) in a MN format. The RRCReconfiguration message comprises at least one conditional reconfiguration for the CPC. The conditional reconfiguration comprises:

for the target candidate cell, another RRC Reconfiguration message (which is referred to herein as RRCReconfiguration*) in MN format and includes a MCG configuration, wherein the RRCReconfiguration* includes the RRCReconfiguration**; and
at least one execution condition for the CPC; and
a conditional reconfiguration identity associated with the CPC for the target candidate cell;

The processing circuitry is configured to receive, from the wireless device, a first reconfiguration complete message. The processing circuitry is configured to receive, from the wireless device, a second RRCReconfigurationComplete message (which is referred to herein as RRCReconfigurationComplete*) in MN format. The RRCReconfiguration-Complete* comprises another RRCReconfigurationComplete message (which is referred to herein as RRCReconfigurationComplete**) in SN format. The RRCReconfigurationComplete* indicates that the wireless device applied the RRCReconfiguration* upon fulfilment of the execution condition. The RRCReconfigurationComplete indicates that the wireless device has applied the RRCReconfiguration and executed the CPC. A release of at least one source SN resource is delayed until the RRCReconfigurationComplete* is received by the network node.

According to certain embodiments, a method by a wireless device for CPC includes receiving, from a network node operating as a MN an RRC Reconfiguration message (which is referred to herein as RRCReconfiguration) in a MN format. The RRCReconfiguration includes at least one conditional reconfiguration for the CPC, and the conditional reconfiguration includes:

for the target candidate cell, another RRC Reconfiguration message (which is referred to herein as RRCReconfiguration*) in MN format and includes a MCG configuration, wherein the RRCReconfiguration* includes the RRCReconfiguration**; and
at least one execution condition for the CPC; and
a conditional reconfiguration identity associated with the CPC for the target candidate cell;

The wireless device transmits, to the network node, a reconfiguration complete message.

According to certain embodiments, a wireless device for CPC includes processing circuitry configured to receive, from a network node operating as a MN an RRC Reconfiguration message (which is referred to herein as RRCReconfiguration) in a MN format. The RRCReconfiguration includes at least one conditional reconfiguration for the CPC, and the conditional reconfiguration includes:

for the target candidate cell, another RRC Reconfiguration message (which is referred to herein as RRCReconfiguration*) in MN format and includes a MCG configuration, wherein the RRCReconfiguration* includes the RRCReconfiguration**; and
at least one execution condition for the CPC; and
a conditional reconfiguration identity associated with the CPC for the target candidate cell;

The processing circuitry is configured to transmit, to the network node, a reconfiguration complete message.

Certain embodiments may provide one or more of the following technical advantages. Specifically, certain embodiments may advantageously make it possible for an MN to initiate the configuration of inter-SN conditional PSCell change. One advantage with the approaches described herein is that it requires less signaling compared to an SN-initiated inter-SN CPC.

Another advantage is that certain embodiments disclosed herein do not require the MN to understand the configurations created by the S-SN or T-SN candidate(s), which may be even more beneficial in the case MN and S-SN/T-SN candidates belong to different Radio Access Technologies (RATs) such as in NR-E-UTRA Dual Connectivity (NE-DC) and/or E-UTRAN New Radio-Dual Connectivity (EN-DC). In other words, the SCG associated message to be applied upon execution does not have to be in MN format. As such, certain embodiments make the method applicable for an EN-DC or other forms of inter-RAT DC, like MR-DC.

Among other aspects, compared to previous techniques for MN-initiated SN change, certain embodiments disclosed herein add further intelligence in the MN such that the MN generates a series of nested RRC Reconfiguration(s) to generate the conditional reconfiguration. Compared to previous techniques for SN-initiated intra-SN CPC, according to certain embodiments disclosed herein, the MN receives an RRCReconfiguration already prepared with the CPC and simply includes that as an SCG configuration to give to the UE.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 illustrates an example method by a wireless device, according to certain embodiments.

DETAILED DESCRIPTION

Figure 1:
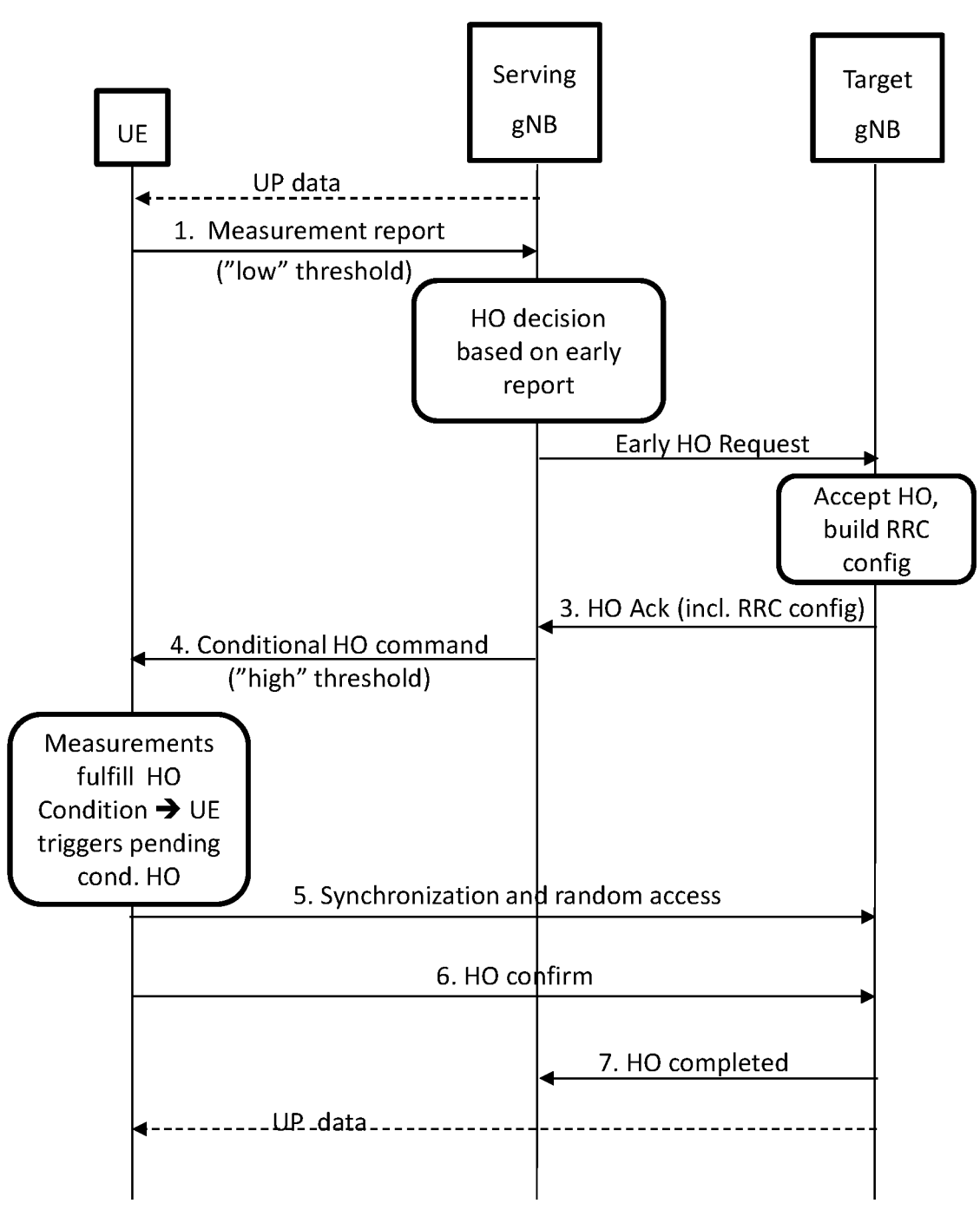
FIG. 1 illustrates an example of conditional handover (CHO) execution.
Figure 2:
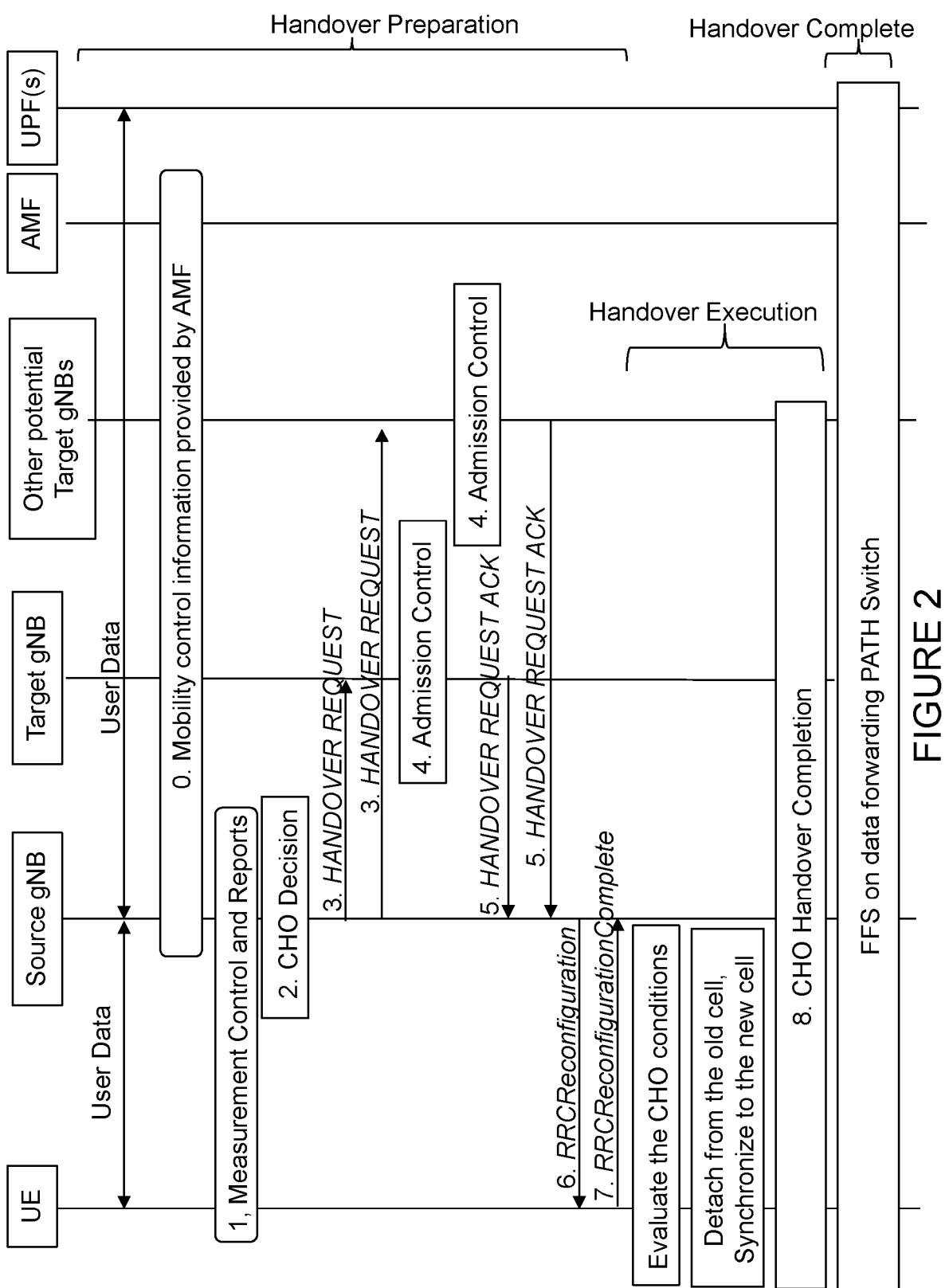
FIG. 2 illustrates the procedure for intra-AMF/UPF Conditional Handover as taken from 3GPP TS 37.300.
Figure 3:
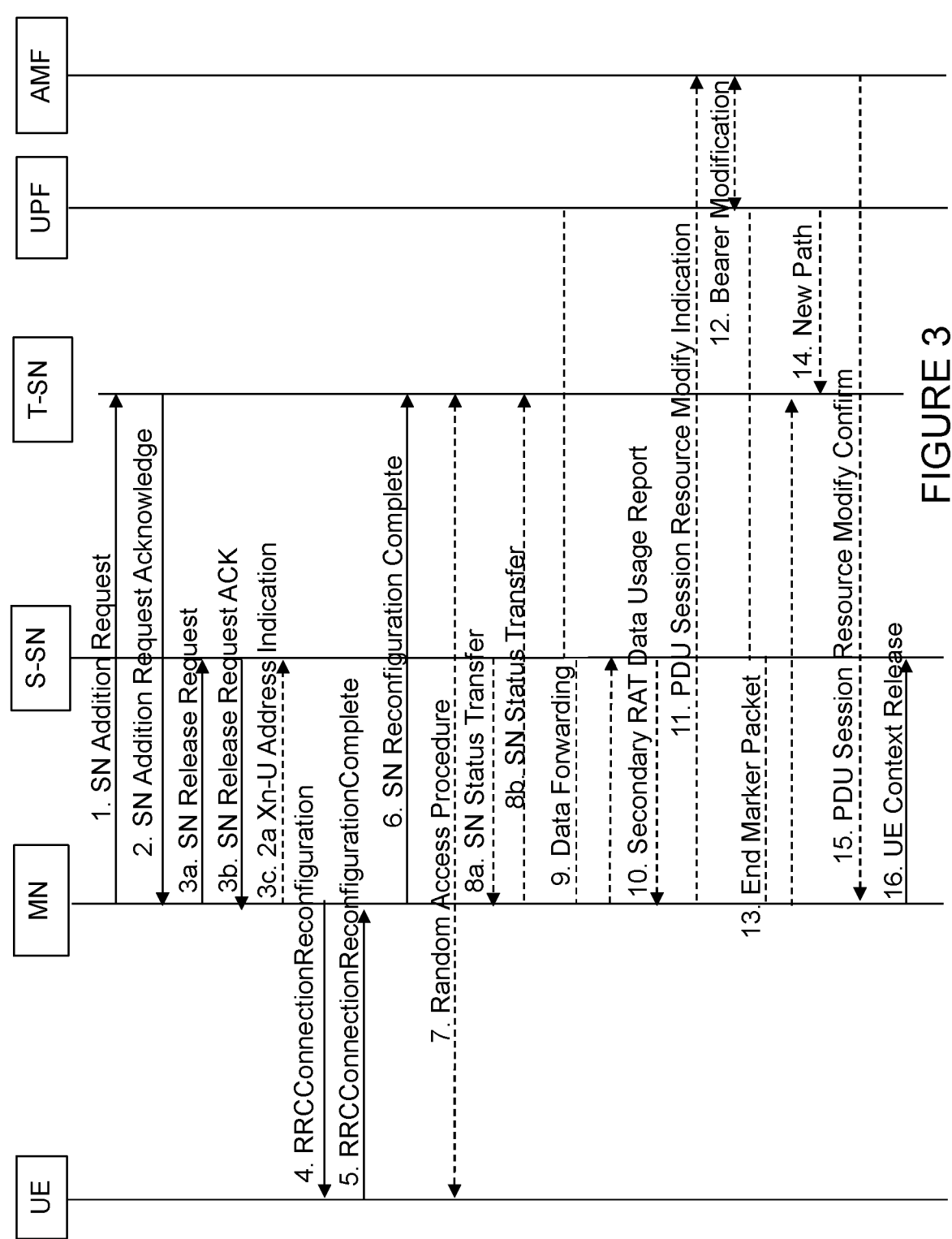
FIG. 3 illustrates an example secondary node (SN) change procedure as initiated by a master node (MN)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present disclosure refers to a User-Equipment (UE) operating in Multi Radio-Dual Connectivity (MR-DC) according to New Radio (NR) specifications such as, for example, 3GPP TS 37.340 and 3GPP TS 38.331. The present disclosure refers to a first network node operating as a Master Node (MN) (e.g., having a Master Cell Group (MCG) configured to the UE and/or an MN-terminated bearer). That MN can be a gNodeB (gNB), a Central Unit gNodeB (CU-gNB), an eNodeB (eNB), a Central Unit eNodeB (CU-gNB), or any network node and/or network function. The present disclosure also refers to a second network node operating as a Secondary Node (SN), or Source Secondary Node (S-SN) (e.g., having a Secondary Cell Group (SCG) configured to the UE and/or an SN-terminated bearer). That SN can be a gNB, a CU-gNB, an eNB, a CU-gNB, or any network node and/or network function. Note that MN, S-SN, and T-SN may be from the same or different RATs (and possibly be associated to different Core Network (CN) nodes).

The present disclosure refers to a target candidate SN, or target SN (T-SN) candidate, as the network node (e.g., gNB) that is prepared during the Conditional PSCell Change (CPC) procedure and that creates an Radio Resource Control (RRC) Reconfiguration message with an SCG configuration to be provided to the User Equipment (UE) and stored, with an execution condition, wherein the UE only applies the message upon the fulfillment of the execution condition. That target candidate SN is associated to one or multiple target candidate cell(s) that the UE can be configured with. The UE then can execute the condition and access one of these target candidate cells, associated to a target candidate SN that becomes the target SN after execution (i.e., upon fulfillment of the execution condition).

The present disclosure refers to a CPC and/or Conditional PSCell Addition (CPA) and/or Conditional PSCell Change/Addition (CPAC) configuration and procedures (like CPAC execution). Other terms may be considered as synonyms such as conditional reconfiguration, or Conditional Configuration (since the message that is stored and applied upon fulfillment of a condition is an RRCReconfiguration or RRCConnectionReconfiguration). Terminology wise, one could also interpret conditional handover (CHO) in a broader sense, also covering CPC or CPAC procedures.

The configuration of CPC can be done using the same Information Elements (IEs) as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs are disclosed in 3GPP TS 38.331. In the present disclosure the terms handover, reconfigurationWithSync, PSCell change are used in the same context. The methods described herein comprise different embodiments in terms of inter-node signaling and inter-node procedures to configure inter-SN initiated conditional PSCell Change (CPC).

In one set of embodiments, a first network node operating as a MN determines to configure CPC for a UE operating in MR-DC. That determination may be based on measurements reports received from the UE. Upon determining to configure CPC, the MN transmits a request to a target SN indicating that CPC is to be configured for a given UE.

Figure 4:
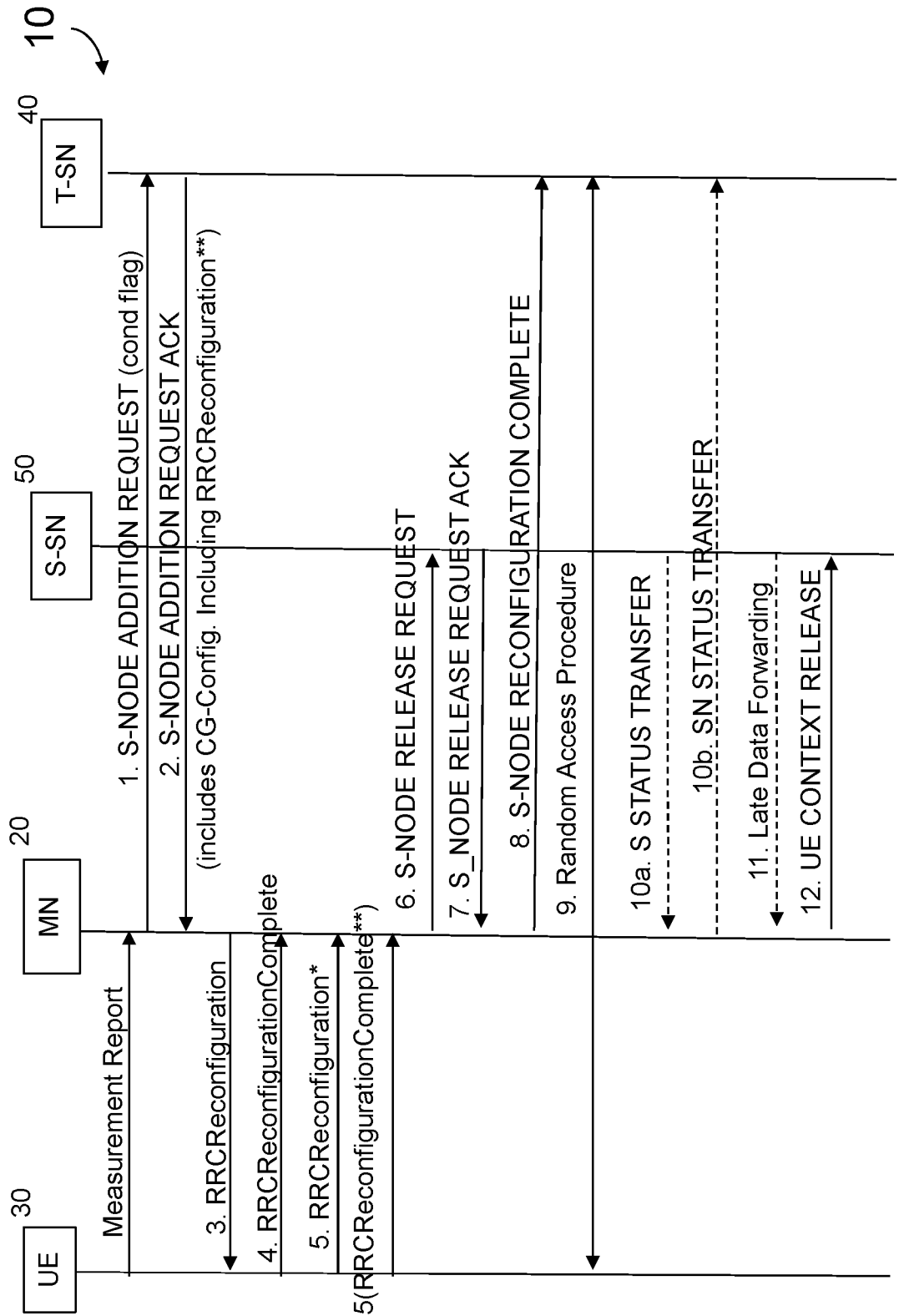
FIG. 4 illustrates an example of inter-SN conditional PSCell Change as initiated by a MN, according to certain embodiments.

FIG. 4 illustrates an example signalling diagram 10 of inter-SN conditional PSCell Change as initiated by a MN 20, according to certain embodiments. The steps illustrated in FIG. 4 are described in more detail below.

At step 1, according to certain embodiments, the node 20 operating as for a UE 30 operating in MR-DC decides to configure CPC for the UE 30. In a particular embodiment, the decision may be based on, for example, measurements reports received from the UE 30. Upon determining to configure CPC, the MN 20 sends to the T-SN 40 an S-NODE ADDITION REQUEST message including an indication that the request is for CPC (i.e., it is not for a PSCell Change to be performed immediately as in previous techniques. In FIG. 4, the term "cond flag" has been used as the indication, but this is merely provided as an example. Other indications may be used.

An example of an enhanced version of the S-NODE ADDITION REQUEST according to the method illustrated in FIG. 4 is shown below. One distinguishing aspect is that it is the MN 20 that decides to configure CPC and initiates the setting of the conditional flag. In this example, the indicator distinguishes SN Addition for the Conditional PSCell Change from the Conditional PSCell Addition. Additionally, the Information Element (IE) CPC Information indicates that the procedure is triggered for a Conditional PSCell Change, as disclosed in 3GPP TS 38.423:

9.1.2.1 S-NODE ADDITION REQUEST

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| UE Security Capabilities | M | | 9.2.3.49 | |
| S-NG-RAN node Security Key | M | | 9.2.3.51 | |
| S-NG-RAN node UE Aggregate Maximum Bit Rate | M | | UE Aggregate Maximum Bit Rate 9.2.3.17 | The UE Aggregate Maximum Bit Rate is split into M-NG-RAN node UE Aggregate Maximum Bit Rate and S-NG-RAN node UE Aggregate Maximum Bit Rate which are enforced by M-NG-RAN node and S-NG-RAN node respectively. |
| Selected PLMN | O | | PLMN Identity 9.2.2.4 | The selected PLMN of the SCG in the S-NG-RAN node. |
| Mobility Restriction List | O | | 9.2.3.53 | |
| Index to RAT/Frequency Selection Priority | O | | 9.2.3.23 | |
| PDU Session Resources To Be Added List | | 1 | | |
| >PDU Session Resources To Be Added Item | | 1 .. <maxnoofPDUSessions> | | NOTE: If neither the PDU Session Resource Setup Info - SN terminated IE nor the PDU Session Resource Setup Info - MN terminated IE is present in a PDU |

| IE/Group Name | Presence | Range | IE type and reference | Semantics description |
|---|---|---|---|---|
| | | | | Session Resources To Be Added Item IE, abnormal conditions as specified in clause 8.3.1.4 apply. |
| >>PDU Session ID | M | | 9.2.3.18 | |
| >S-NSSAI | M | | 9.2.3.21 | |
| >>S-NG-RAN node PDU Session Aggregate Maximum Bit Rate | O | | PDU Session Aggregate Maximum Bit Rate 9.2.3.69 | |
| >>PDU Session Resource Setup Info - SN terminated | O | | 9.2.1.5 | |
| >>PDU Session Resource Setup Info - MN terminated | O | | 9.2.1.7 | |
| M-NG-RAN node to S-NG-RAN node Container | M | | OCTET STRING | Includes the CG-ConfigInfo message as defined in subclause 11.2.2 of TS 38.331 [10] |
| S-NG-RAN node UE XnAP ID | O | | NG-RAN node UE XnAP ID 9.2.3.16 | Allocated at the S-NG-RAN node |
| Expected UE Behaviour | O | | 9.2.3.81 | |
| Requested Split SRBs | O | | ENUMER-ATED (srb1, srb2, srb1&2, ...) | Indicates that resources for Split SRBs are requested. |
| PCell ID | O | | Global NG-RAN Cell Identity 9.2.2.27 | |
| Desired Activity Notification Level | O | | 9.2.3.77 | |
| Available DRB IDs | C-ifSNter-minated | | DRB List 9.2.1.29 | Indicates the list of DRB IDs that the S-NG-RAN node may use for SN-terminated bearers. |
| S-NG-RAN node Maximum Integrity Protected Data Rate Uplink | O | | Bit Rate 9.2.3.4 | The S-NG-RAN node Maximum Integrity Protected Data Rate Uplink is a portion of the UE's Maximum Integrity Protected Data Rate in the Uplink, which is enforced by the S-NG-RAN node for the UE's SN terminated PDU sessions. If the S-NG-RAN node Maximum Integrity Protected Data Rate Downlink IE is not present, this IE applies to both UL and DL. |

-continued

| IE/Group Name | Presence | Range | IE type and reference | Semantics description |
|---|---|---|---|---|
| S-NG-RAN node Maximum Integrity Protected Data Rate Downlink | O | | Bit Rate 9.2.3.4 | The S-NG-RAN node Maximum Integrity Protected Data Rate Downlink is a portion of the UE's Maximum Integrity Protected Data Rate in the Downlink, which is enforced by the S-NG-RAN node for the UE's SN terminated PDU sessions. |
| Location Information at S-NODE reporting | O | | ENUMER-ATED (pscell, ...) | Indicates that the user's Location Information at S-NODE is to be provided. |
| MR-DC Resource Coordination Information | O | | 9.2.2.33 | Information used to coordinate resource utilisation between M-NG-RAN node and S-NG-RAN node. |
| Masked IMEISV | O | | 9.2.3.32 | |
| NE-DC TDM Pattern | O | | 9.2.2.38 | |
| SN Addition Trigger Indication | O | | ENUMER-ATED (SN change, inter-MN HO, intra-MN HO, ...) | This IE indicates the trigger for S-NG-RAN node Addition Preparation procedure |
| Trace Activation | O | | 9.2.3.55 | |
| Requested Fast MCG recovery via SRB3 | O | | ENUMER ATED (true, ...) | Indicates that the resources for fast MCG recovery via SRB3 are requested. |
| UE Radio Capability ID | O | | 9.2.3.138 | |
| CPC Information | O | | ENUMER ATED (cpc, ...) | Indicates that the procedure is triggered for a Conditional PSCell Change |

| Range bound | Explanation |
|---|---|
| maxnoofPDUSessions | Maximum no. of PDU sessions. Value is 256 |

| Condition | Explanation |
|---|---|
| ifSNterminated | This IE shall be present if there is at least one PDU Session Resource Setup Info - SN terminated in the PDU Session Resources To Be Added List IE. |

At step 2 in the example embodiment of FIG. 4, the node operating as candidate T-SN 40 sends to the MN 20 an S-NODE ADDITION REQUEST ACKNOWLEDGE message, including an RRC Reconfiguration message (e.g., RRCReconfiguration created/generated by that target candidate SN 40) associated to at least one SCG, wherein the SpCell and SCells of the SCG are associated to the target candidate SN 40. That RRC Reconfiguration (RRCReconfiguration) can be, for example, included in an RRC container like the CG-Config. In the non-limiting example below, the RRCReconfiguration will in this case stay in the MN 20 for building a message to the UE 30**.

S-Node Addition Request Acknowledge

This message is sent by the S-NG-RAN node to confirm the M-NG-RAN node about the S-NG-RAN node addition preparation (or S-NG-RAN node addition preparation for Conditional reconfiguration).

Direction: S-NG-RAN node→M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | reject |
| S-NG-RAN node UE XnAP ID | M | | NG-RAN node UE XnAP ID 9.2.3.16 | Allocated at the S-NG-RAN node | YES | reject |
| . . . | . . . | | . . . | | . . . | |
| S-NG-RAN node to M-NG-RAN node Container | M | | OCTET STRING | Includes the CG-Config message as defined in subclause 11.2.2 of TS 38.331 [10]. Note: in the example above this is includes the RRCReconfiguration** generated by the target candidate SN. | YES | reject |
| Location Information at S-NODE | O | | Target Cell Global ID 9.2.3.25 | Contains information to support localisation of the UE | YES | ignore |
| MR-DC Resource Coordination Information | O | | 9.2.2.33 | Information used to coordinate resource utilisation between M-NG-RAN node and S-NG-RAN node. | YES | ignore |

In case the T-SN can prepare multiple target candidate cells, the IE within the message may contain multiple configurations for multiple candidate cells. Alternatively, that contains a list of containers for additional CO-config messages related to the additional candidate cells.

CG-Config Message

```
-- ASN1START
-- TAG-CG-CONFIG-START
. . .
```

-continued

```
CG-Config-IEs ::=  SEQUENCE {
    scg-CellGroupConfig   OCTET STRING (CONTAINING
RRCReconfiguration)   OPTIONAL,
    scg-RB-Config   OCTET STRING (CONTAINING
RadioBearerConfig)   OPTIONAL,
    configRestrictModReq   ConfigRestrictModReqSCG
OPTIONAL,
    drx-InfoSCG   DRX-Info   OPTIONAL,
    candidateCellInfoListSN   OCTET STRING (CONTAINING
MeasResultList2NR)   OPTIONAL,
    measConfigSN   MeasConfigSN   OPTIONAL,
    selectedBandCombination   BandCombinationInfoSN
OPTIONAL,
    fr-InfoListSCG   FR-InfoList   OPTIONAL,
    candidateServingFreqListNR   Candidate ServingFreqListNR
OPTIONAL,
    nonCriticalExtension   CG-Config-v1540-IEs
OPTIONAL
```

-continued

```
}
MeasConfigSN ::=  SEQUENCE {
    measuredFrequenciesSN   SEQUENCE (SIZE (1..maxMeasFreqsSN))
OF NR-FreqInfo OPTIONAL,
    ...
}
...
-- TAG-CG-CONFIG-STOP
-- ASN1STOP
```

...
scg-CellGroupConfig
Contains the RRCReconfiguration message (containing only secondaryCellGroup
and/or measConfig):
    -    to be sent to the UE, used upon SCG establishment, modification or
         conditional reconfiguration for a target candidate SCG (e.g. CPC), as
         generated (entirely) by the (target) SgNB (or taget candidate SgNB in case
         of conditional reconfiguration for CPC). In this case, the SN sets the
         RRCReconfiguration message in accordance with clause 6 e.g. regarding the
         "Need" or "Cond" statements.
    or
    -    including the current SCG configuration of the UE, when provided in
         response to a query from MN, or in SN triggered SN change in order to
         enable delta signaling by the target SN. In this case, the SN sets the
         RRCReconfiguration message in accordance with clause 11.2.3.
The field is absent if neither SCG (re)configuration nor SCG configuration query
nor SN triggered SN change is performed, e.g. at inter-node
capability/configuration coordination which does not result in SCG
(re)configuration towards the UE. This field is not applicable in NE-DC.

Thus, the field scg-CellGroupConfig of CG-Config (included in the S-NODE ADDITION REQUEST ACKNOWLEDGE message sent from the candidate T-SN 40 to the MN 20) is set to the RRCReconfiguration (i.e., the reconfiguration of the target candidate SCG (to be stored upon reception at the UE 30**, but only applied upon fulfilment of the execution condition)).

An example procedure at the MN 20 for building an RRCReconfiguration to the UE (for a UE already in MR-DC) including CPC configuration(s) with SCG configuration provided by target SN candidate(s) is described below.

At step 3 of the example embodiment of FIG. 4, upon reception of the acknowledge message (S-NODE ADDITION REQUEST ACKNOWLEDGE) from the target candidate SN 40 described above in relation to Step 2. the MN 20 generates a new RRC Reconfiguration message (e.g., denoted RRCReconfiguration) to be provided to the UE 30. That new RRC Reconfiguration message (RRCReconfiguration created/generated by the MN 20) contains at least a conditional reconfiguration (e.g., field conditionalReconfiguration and/or IE ConditionalReconfiguration for CPC). This RRC Reconfiguration message (e.g., denoted RRCReconfiguration) is in MN format. For example, if the UE 30 is in an inter-RAT DC mode, like EN-DC (LTE MN and NR SN), this would be an LTE RRC message, like an RRCConnectionReconfiguration, as defined in TS 36.331.

In certain embodiments, the conditional reconfiguration comprises at least one of the following:
For each target candidate (i.e., target candidate PSCell), another RRC Reconfiguration in MN format also generated by the MN 20 (e.g., denoted RRCReconfiguration*).
    If the MN 20 is an LTE node (e.g., for a UE in EN-DC), that message can be an RRCConnectionReconfiguration*
    Within that message, the MN 20 includes the RRC Reconfiguration generated by the target candidate SN 40 (e.g., denoted RRCReconfiguration**). That message is in SN format.
    The UE 30 is to apply the RRCReconfiguration* upon fulfilment of the condition and, as RRCReconfiguration is inside as an SCG reconfiguration (e.g., field nr-SCG) the UE 30 also applies the RRCReconfiguration in SN format (i.e., performing actions upon according to the SN RRC specifications).
An execution condition associated to it (e.g., pointing to one or multiple MeasId(s)).

In addition, that new RRC Reconfiguration message (RRCReconfiguration created by the MN 20 and in format) may contain a measurement configuration associated to the MeasId(s) for conditional reconfiguration (i.e., having conditional reconfiguration as report Type). That is to be applied upon reception (i.e., when the UE 30 is being configured with CPC during preparation).

When generating the new RRC message, MN 20 generates the field conditionalReconfiguration of IE ConditionalReconfiguration, as follows below. One distinguishable aspect here is that it is the MN 20 that generates the RRC message with the conditional reconfiguration:

RRCReconfiguration Message

```
-- ASN1START
-- TAG-RRCRECONFIGURATION-START
...
RRCReconfiguration-IEs ::=   SEQUENCE {
    radioBearerConfig   RadioBearerConfig
OPTIONAL, -- Need M
    secondaryCellGroup   OCTET STRING (CONTAINING
CellGroupConfig)   OPTIONAL, -- Need M
    measConfig   MeasConfig
OPTIONAL, -- Need M
    lateNonCriticalExtension   OCTET STRING
OPTIONAL,
    nonCriticalExtension   RRCReconfiguration-v1530-IEs
OPTIONAL
}
RRCReconfiguration-v16xy-IEs ::=   SEQUENCE {
    otherConfig-v16xy   OtherConfig-v16xy   OPTIONAL,
-- Need M
    bap-Config-r16   SetupRelease { BAP-Config-r16 }
OPTIONAL, -- Need M
    conditionalReconfiguration-r16   ConditionalReconfiguration-r16
OPTIONAL, -- Need M
daps-SourceRelease-r16   ENUMERATED{true}
OPTIONAL, -- Need N
    sl-ConfigDedicatedNR-r16   SetupRelease
{SL-ConfigDedicatedNR-r16} OPTIONAL, -- Need M
    sl-ConfigDedicatedEUTRA-r16   SetupRelease {SL-
ConfigDedicatedEUTRA-r16} OPTIONAL, -- Need M
    nonCriticalExtension   SEQUENCE { }   OPTIONAL
}
-- TAG-RRCRECONFIGURATION-STOP
-- ASN1STOP
``` conditionalReconfiguration
Configuration of candidate target SpCell(s) and execution condition(s) for conditional handover or conditional PSCell change. For conditional PSCell change, this field may ~~only~~ be present in an RRCReconfiguration message for intra-SN PSCell change or inter-SN PSCell change (e.g. MN-initiated ). The network does not configure a UE with both conditional PCell change and conditional PSCell change simultaneously. The field is absent if any DAPS bearer is configured or if the masterCellGroup includes ReconfigurationWithSync. For conditional PSCell change, the field is absent if the secondaryCellGroup includes ReconfigurationWithSync.
. . .

ConditionalReconfiguration Information Element

15

```
-- ASN1START
-- TAG-CONDITIONALRECONFIGURATION-START
ConditionalReconfiguration-r16 ::=   SEQUENCE {
   attemptCondReconfig-r16   ENUMERATED {true}   OPTIONAL,
-- Cond PCell                                          20
   condReconfigToRemoveList-r16   CondReconfigToRemoveList-r16
OPTIONAL,   -- Need N
   condReconfigToAddModList-r16   CondReconfig ToAddModList-r16
OPTIONAL,   -- Need N
   ...
}                                                      25
CondReconfigToRemoveList-r16 ::=   SEQUENCE (SIZE (1..
maxNrofCondCells-r16)) OF CondReconfigId-r16
-- TAG-CONDITIONALRECONFIGURATION-STOP
-- ASN1STOP
```

ConditionalReconfiguration field descriptions

. . .
condReconfigToAddModList
List of the configuration of candidate SpCells to be added or modified for CHO or CPC.
. . .

CondReconfigToAddModList Information Element

40

```
-- ASN1START
-- TAG-CONDRECONFIGTOADDMODLIST-START                  45
CondReconfigToAddModList-r16 ::=   SEQUENCE (SIZE (1..
maxNrofCondCells- r16)) OF CondReconfigToAddMod-r16
CondReconfigToAddMod-r16 ::=   SEQUENCE {
   condReconfigId-r16   CondReconfigId-r16,
   condExecutionCond-r16   SEQUENCE (SIZE (1..2)) OF MeasId
OPTIONAL,   -- Cond condReconfigAdd                    50
   condRRCReconfig-r16   OCTET STRING (CONTAINING
RRCReconfiguration) OPTIONAL,   -- Cond condReconfigAdd
   ...
}
-- TAG-CONDRECONFIGTOADDMODLIST-STOP
-- ASN1STOP
                                                       55
```

CondReconfigToAddMod field descriptions condExecutionCond
The execution condition that needs to be fulfilled in order to trigger the execution of a conditional reconfiguration. When configuring 2 triggering events (MeasId's) for a candidate cell, network ensures that both refer to the same measObject.
condRRCReconfig -continued

| CondReconfigToAddMod field descriptions |
| --- |
| The RRCReconfiguration message to be applied when the condition(s) are fulfilled. The RRCReconfiguration message contained in condRRCReconfig cannot contain the field conditionalReconfiguration. |

For each target candidate cell (i.e., target candidate PSCell) the MN 20 generates an RRC Reconfiguration (e.g., denoted RRCReconfiguration*) message in MN format. Inside that RRCReconfiguration* message, the MN 20 sets the SCG configuration to be the SCG RRC Reconfiguration received by the target candidate SN 40 associated to the target candidate PSCell; for example, the MN 20 sets the nr-SCG field of RRCReconfiguration* to the RRCReconfiguration received from the target candidate SN 40. Then, in the RRC Reconfiguration message in format to be send to the UE 30**, it sets per candidate the condRRCReconfig to the RRCReconfiguration*. The nest structure can be something as shown below:

RRCReconfiguration (MN format): message to be sent to the UE 30 and applied upon reception;
Conditional Reconfiguration: applied upon reception;
RRCReconfiguration* (MN format): applied upon execution fulfillment, leads to the creation of an RRCReconfigurationComplete* to be sent to the MN 20 by the UE 30;
nr-SCG set to RRCReconfiguration (SN format): applied upon execution fulfillment, leads to the creation of an RRCReconfigurationComplete to be sent to the MN 20 by the UE 30 within the RRCReconfigurationComplete*; that RRCReconfigurationComplete is then forwarded by the MN 20 to the target SN 40 associated to the PSCell candidate the UE 30** has performed CPC execution.

In a particular embodiment, the MN 20 sets the condRRCReconfig field (or equivalent) to be included in CondReconfigToAddModList (for the target candidate cell associated to the target SN candidate for CPC) to the RRCReconfiguration*, generated by the MN 20 and including in its SCG/MR-DC configuration the RRCReconfiguration generated by the target candidate SN 40**. If there have been multiple target candidate cells (from the same or different SN(s)), that step is repeated for each candidate cell.

In a particular embodiment, the MN 20 sets the condExecutionCond (one or multiple MeasId(s)) based on an MCG measurement configuration is either already configured to the UE 30. Or, alternatively, that measurement configuration can be a measConfig field of IE MeasConfig included in the same RRC Reconfiguration including the conditional reconfiguration (e.g., for CPC). That measConfig contains the measId(s) later referred in the execution condition, which are associated to a measurement object (in the frequency of the target candidate SCG) and whose reportType in reportConfig of IE ReportConfigNR is set to condTriggerConfig of IE CondTriggerConfig, as follows:

```
ReportConfigNR ::=   SEQUENCE {
    reportType   CHOICE {
        periodical   PeriodicalReportConfig,
        eventTriggered   EventTriggerConfig,
        ...,
        reportCGI   ReportCGI,
        reportSFTD   ReportSFTD-NR,
```

-continued

```
        condTriggerConfig-r16   CondTriggerConfig-r16,
        cli-Periodical-r16   CLI-PeriodicalReportConfig-r16,
        cli-EventTriggered-r16   CLI-EventTriggerConfig-r16
    }
}
CondTriggerConfig-r16 ::=   SEQUENCE {
    condEventId   CHOICE {
        condEventA3   SEQUENCE {
            a3-Offset   MeasTriggerQuantityOffset,
            hysteresis   Hysteresis,
            timeToTrigger   TimeToTrigger
        },
        condEventA5   SEQUENCE {
            a5-Threshold1   MeasTriggerQuantity,
            a5-Threshold2   MeasTriggerQuantity,
            hysteresis   Hysteresis,
            timeToTrigger   TimeToTrigger
        },
        ...
    },
    rsType-r16   NR-RS-Type,
    ...
}
```

After generating the RRCReconfiguration message the MN 20 sends the message to the UE 30.

At step 4 of the example embodiment of FIG. 4, upon applying the message, the UE 30 configures the conditional reconfiguration (i.e., starts the monitoring of execution condition(s)) and stores the RRC Reconfiguration for each target candidate PSCell. For example, the UE 30 may store per target candidate an RRCReconfiguration* that has an SCG configuration for the target candidate PSCell (e.g. nr-SCG=RRCReconfiguration** with a reconfiguration With Sync).

One new aspect according to the method described herein concerns how the UE 30 determines the applicable cell to be monitored for an execution condition associated to an RRCReconfiguration* message. According to previous techniques, for each condReconfigId within the VarConditionalReconfig, the UE 30 considers the cell which has a physical cell identity matching the value indicated in the ServingCellConfigCommon included in the reconfigurationWithSync in the received condRRCReconfig to be applicable cell.

However, according to the methods described herein, as a new nested structure is introduced, in the MN-initiated CPC, the UE 30 considers the cell which has a physical cell identity matching the value indicated in the ServingCcllConfigCommon included in the reconfigurationWithSync in the nr-SCG received in the condRRCReconfig to be applicable cell.

An example is shown in RRC for this first loop where CPC is configured at the UE:

// loop 1: UE gets configured with CPC i.e. receives message in MN format and starts monitoring
// conditions based on MN/MCG measConfig

. . .

5.3.5.3 Reception of an RRCReconfiguration by the UE

The UE shall perform the following actions upon reception of the RRCReconfiguration, or upon execution of the conditional reconfiguration (CHO or CPC):

. . .

1> if the RRC Reconfiguration message includes the measConfig:

2> perform the measurement configuration procedure as specified in 5.5.2;

. . .

1> if the RRCReconfiguration message includes the conditionalReconfiguration:

2> perform conditional reconfiguration as specified in 5.3.5.13;

. . .

1> set the content of the RRCReconfigurationComplete message as follows:

. . .

1> else (RRCReconfiguration was received via SRB1):

2> submit the RRCReconfigurationComplete message via SRB1 to lower layers for transmission using the new configuration;

2> if this is the first RRCReconfiguration message after successful of the RRC re-establishment procedure:

3> resume SRB2 and DRBs that are suspended;

. . .

5.3.5.13 Conditional Reconfiguration
5.3.5.13.1 General

. . .

The UE performs the following actions based on a received ConditionalReconfiguration IE:

. . .

1> if the ConditionalReconfiguration contains the condReconfigAddModList:

2> perform conditional reconfiguration addition/modification as specified in 5.3.5.13.3;

. . .

5.3.5.13.3 Conditional Reconfiguration Addition/Modification

For each condReconfigId received in the condReconfigToAddModList IE the UE shall:

. . .

1> else:

2> add a new entry for this condReconfigId within the VarConditionalReconfig;

1> perform conditional reconfiguration evaluation as specified in 5.3.5.13.4;

5.3.5.13.4 Conditional Reconfiguration Evaluation

The UE shall:

1> for each condReconfigId within the VarConditionalReconfig:

2> consider the cell which has a physical cell identity matching the value indicated in the ServingCellConfigCommon included in the reconfigurationWithSync in the received condRRCReconfig to be applicable cell; or 2> consider the cell which has a physical cell identity matching the value indicated in the ServingCellConfigCommon included in the rcconfigurationWithSync in the nr-SCG received in the condRRCReconfig to be applicable cell;

2> for each measId included in the measIdList within VarMeasConfig indicated in the condExecutionCond associated to condReconfigId:

3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be fulfilled;

3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be not fulfilled;

In response to the configuration, the UE 30 generates a complete message in response to the MN 20.

At this point, one can consider that conditional reconfiguration is configured (preparation phase). Thus, the UE 30 monitors the execution conditions, the candidate target SN (T-SN) is/are prepared, and the MN 20 receives acknowledgment that the UE 30 has successfully applied conditional reconfiguration.

After the UE 30 is configured with conditional reconfiguration, the UE 30 starts to monitor the execution condition(s) associated to the target candidate's RRC Reconfiguration.

At step 5 of the example embodiment of FIG. 4, upon fulfilment of the condition, the UE 30 first applies the RRC reconfiguration in MN format (RRCReconfiguration*) and, while that is being applied, the UE 30 finds the NR SCG configuration. For example, the UE 30 may find the NR SCG configuration in the nr-SCG field or an equivalent in case the SCG is LTE or in the case of EN-DC). In other words, the UE 30 also applies the associated target candidate's RRC Reconfiguration (e.g., RRCReconfiguration**).

As part of that, the UE 30 generates two complete messages. For example, the UE 30 generates a RRCReconfigurationComplete* message to acknowledge the target candidate SN (T-SN) 40 that the UE 30 has successfully applied the target candidates RRC Reconfiguration (e.g., RRCReconfiguration). The UE 30** also generates an RRCReconfigurationComplete* (in MN format) message, which is included within RRCReconfigurationComplete*, and is submitted to lower layers for transmission via the MN 20.

In particular embodiments, the method may also include a possible rule enabling the UE 30 to distinguish between the case where the SCG configuration is applied for an MN-initiated CPC configuration compared to a legacy CPC configuration so that, based on the distinction, the UE 30 determines how to transmit the complete message associated to the SCG RRC reconfiguration that is applied leading to a PSCell change:

In legacy RRC, if the RRCReconfiguration message was received via SRB1 within the nr-SCG within mrdc-SecondaryCellGroup (UE in NR DC, mrdc-SecondaryCellGroup was received in RRCReconfiguration via SRB1), AND if the RRCReconfiguration is applied due to a conditional reconfiguration execution, the UE submits the RRCReconfigurationComplete message via the NR MCG embedded in NR RRC message ULInformationTransferMRDC as specified in clause 5.7.2a.3;

However, according to certain embodiments of the method described herein, the UE 30 only submits the RRCReconfigurationComplete message via the NR MCG embedded in NR RRC message ULInformation-TransferMRDC as specified in clause 5.7.2a.3, if the RRCReconfigurationComplete** has not been included in an nr-SCG-Response (within RRCReconfigurationComplete) and has not been transmitted yet;

Note: One goal here is to avoid the transmission of the RRCReconfigurationComplete** twice, via the RRCReconfigurationComplete* and via the ULInformationTransferMRDC.

// loop 2: UE applies RRCReconfiguration*, which includes nr-SCG=RRCReconfiguration**

5.3.5.13 Conditional Reconfiguration

. . .

5.3.5.13.4 Conditional Reconfiguration Evaluation

The UE shall:

3> initiate the conditional reconfiguration execution, as specified in 5.3.5.13.5;

. . .

5.3.5.13.5 Conditional Reconfiguration Execution

The UE shall:

1> if more than one triggered cell exists:
2> select one of the triggered cells as the selected cell for conditional reconfiguration execution;
1> for the selected cell of conditional reconfiguration execution:
2> apply the stored condRRCReconfig of the selected cell and perform the actions as specified in 5.3.5.3;

. . .

5.3.5.3 Reception of an RRCReconfiguration by the UE

The UE shall perform the following actions upon reception of the RRCReconfiguration, or upon execution of the conditional reconfiguration (CHO or CPC):

. . .

1> if the RRCReconfiguration includes the mrdc-SecondaryCellGroupConfig:
2> if the mrdc-SecondaryCellGroupConfig is set to setup:
. . .
3> if the received mrdc-SecondaryCellGroup is set to nr-SCG:
4> perform the RRC reconfiguration according to 5.3.5.3 for the RRCReconfiguration message included in nr-SCG;

. . .

1> set the content of the RRCReconfigurationComplete message as follows:
. . .
2> if the RRCReconfiguration message includes the mrdc-SecondaryCellGroupConfig with mrdc-SecondaryCellGroup set to nr-SCG:
3> include in the nr-SCG-Response the RRCReconfigurationComplete message;
. . .

. . .

1> else (RRCReconfiguration was received via SRB1):
2> submit the RRCReconfigurationComplete message via SRB1 to lower layers for transmission using the new configuration;
2> if this is the first RRCReconfiguration message after successful completion of the RRC re-establishment procedure:
3> resume SRB2 and DRBs that are suspended;
// loop 3: UE applies nr-SCG=RRCReconfiguration**

5.3.5.3 Reception of an RRCReconfiguration by the UE

The UE shall perform the following actions upon reception of the RRCReconfiguration, or upon execution of the conditional reconfiguration (CHO or CPC):

. . .

1> if the RRCReconfiguration includes the secondary-CellGroup:
2> perform the cell group configuration for the SCG according to 5.3.5.5;

. . .

1> set the content of the RRCReconfigurationComplete message as follows:

. . .

1> else if the RRCReconfiguration message was received via SRB1 within the nr-SCG within mrdc-SecondaryCellGroup (UE in NR-DC, mrdc-SecondaryCellGroup was received in RRCReconfiguration via SRB1):
2> if the RRCReconfiguration is applied due to a conditional reconfiguration execution:
3> if the RRCReconfigurationComplete has not been included in an nr-SCG-Response and has not been transmitted:
4> submit the RRCReconfigurationComplete message via the NR MCG embedded in NR RRC message ULInformationTransferMRDC as specified in clause 5.7.2a.3.
2> if reconfigurationWithSync was included in spCellConfig in nr-SCG:
3> initiate the Random Access procedure on the PSCell, as specified in TS 38.321 [3];
2> else
3> the procedure ends;

. . .

1> if reconfigurationWithSync was included in spCellConfig of an MCG or SCG, and when MAC of an NR cell group successfully completes a Random Access procedure triggered above:
2> stop timer T304 for that cell group;
2> stop timer T310 for source SpCell if running;
. . .
2> if the reconfigurationWithSync was included in spCellConfig of an MCG; or:
2> if the reconfigurationWithSync was included in spCellConfig of an SCG and the CPC was configured
3> remove all the entries within VarConditionalReconfig, if any;
3> for each measId of the source SpCell configuration, if the associated reportConfig has a reportType set to condTriggerConfig:
4> for the associated reportConfigId:
5> remove the entry with the matching reportConfigId from the reportConfigList within the VarMeasConfig;
4> if the associated measObjectId is only associated to a reportConfig with reportType set to cho-TriggerConfig:
5> remove the entry with the matching measObjectId from the measObjectList within the VarMeasConfig;
4> remove the entry with the matching measId from the measIdList within the VarMeasConfig;

. . .

At step 6 of the example embodiment of FIG. 4, upon reception of the message from the UE 30 including the complete message acknowledging the successful configuration with the target candidate SN message, the MN 20 sends a release message to the Source SN 50 (e.g., S-NODE RELEASE REQUEST) to confirm the release of the source SN resources.

At step 7 of the example embodiment of FIG. 4, the source SN 50 responds with, for example, an S-NODE RELEASE REQUEST ACKNOWLEDGE to confirm the release of the source SN resources.

It may be noted that in the legacy MN-initiated SN change, the MN 20 sends a message to the Source SN 50 (e.g., S-NODE RELEASE REQUEST) to confirm the release of the source SN resources upon reception of the message from the UE 30 in response to the configuration from MN 20 to the UE 30. However, according to certain embodiments of the method described herein, what triggers the MN 20 to send the message to the Source SN 50 (e.g., S-NODE RELEASE REQUEST) to confirm the release of the source SN resources is the indication from the UE 30 that the UE 30 has executed conditional reconfiguration (e.g., reception of the RRCReconfigurationComplete* including the RRCReconfigurationComplete**).

At step 8 of the example embodiment of FIG. 4, upon receiving the complete message from the UE 30, the MN 20 determines to which target candidate SN node 40 it is to send the complete message (e.g., RRCReconfigurationComplete**)

In a particular embodiment, one alternative is to use an indication that the UE 30 includes in the complete message (e.g., a cell identity for the cell for which conditional reconfiguration has been executed), or a conditional reconfiguration identity. In this scenario, the MN 20 maintains a mapping between a reported identifier and the target candidate SN ID that should receive the complete message.

In another particular embodiment, the MN 20 informs the target SN 40 via an RRC TRANSFER message with the RRCReconfigurationComplete embedded.

In yet another particular embodiment, the MN 20 informs the target SN 40 via S-NODE RECONFIGURATION COMPLETE or SgNB Reconfiguration Complete message with the encoded NR RRC response message for the target SN 40, if received from the UE 30.

At step 9 of the example embodiment of FIG. 4, the UE 30 perform random access procedure with the target candidate cell that has been selected during conditional reconfiguration execution.

At step 10 of the example embodiment of FIG. 4, the source SN 50 freezes PDCP and sends the uplink PDCP SN and HFN receiver status and the downlink PDCP SN and HFN transmitter status to the MN in a SN STATUS TRANSFER message. The MN forwards these status to one of the target candidate SNs 40 (i.e., the one the UE has accessed) in a SN STATUS TRANSFER message.

At step 11 of the example embodiment of FIG. 4, the source SN 50 starts data forwarding for the SN-terminated bearers towards the MN 20, which will forward these packets to the T-SN 40 as shown in FIG. 4.

At step 12 of the example embodiment of FIG. 4, the UE Context is released from the S-SN 50.

Figure 5:
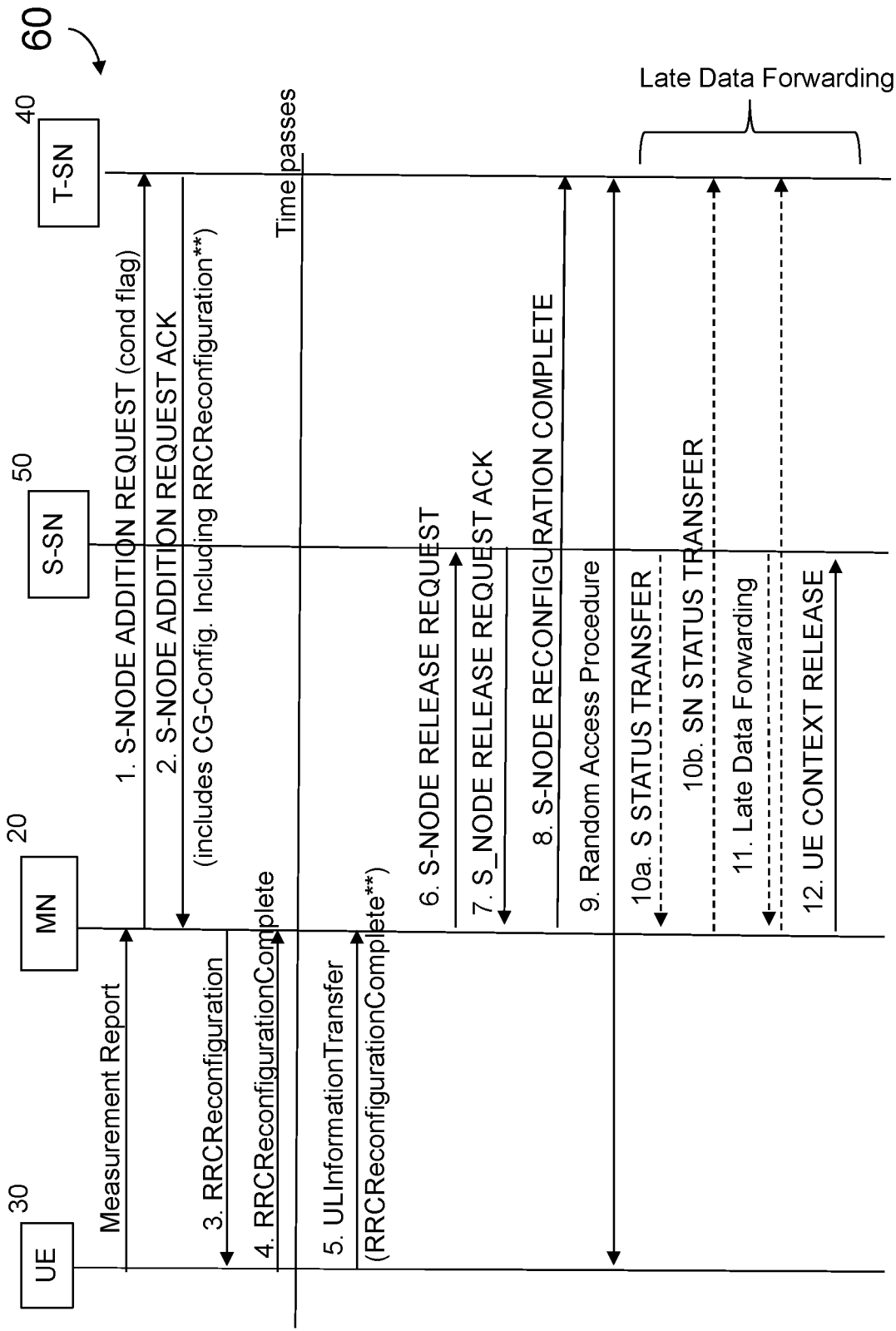
FIG. 5 illustrates another example of inter-SN conditional PSCell change as initiated by a MN, according to certain embodiments.

FIG. 5 illustrates another example 60 of MN-initiated inter-SN conditional PSCell change, according to certain embodiments. FIG. 5 is similar to FIG. 4, and the description of FIG. 4, as provided above. generally applies to FIG. 5 as well. One distinction between the example embodiments of FIG. 4 and FIG. 5 is that at step 5 of the example embodiment of FIG. 5, the UE 30 submits the RRCReconfigurationComplete** in an ULInformationTransfer message.

Figure 6:
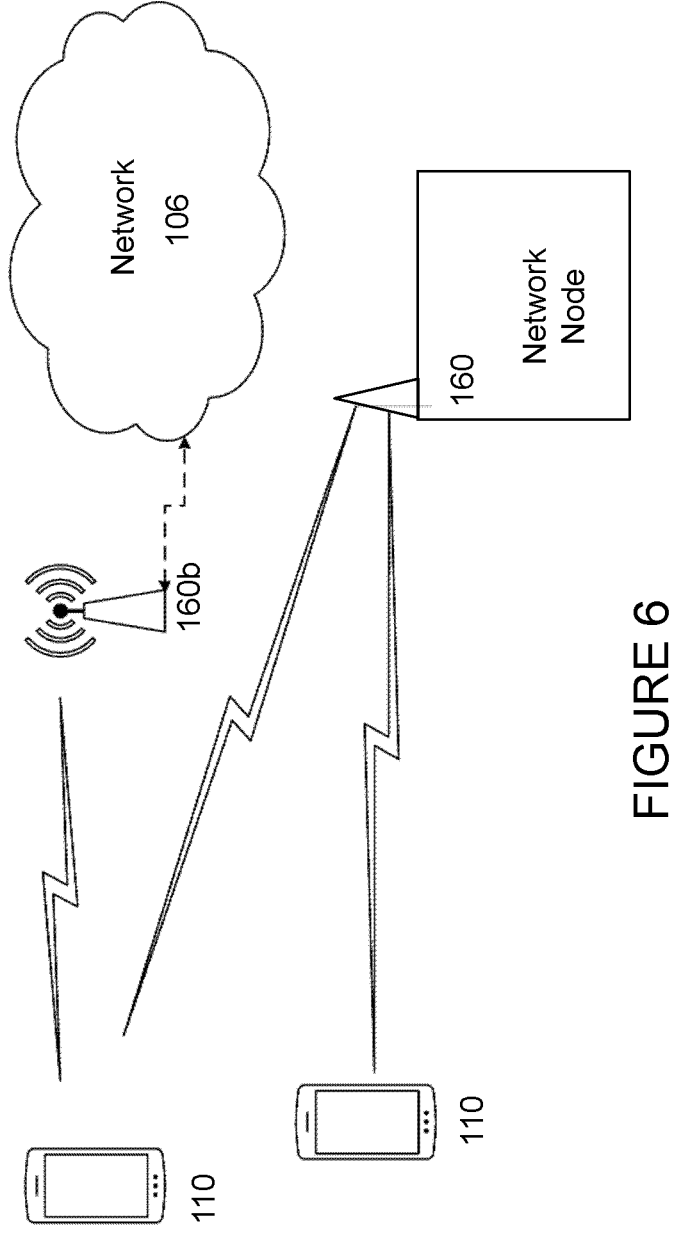
FIG. 6 illustrates an example wireless network, according to certain embodiments.

FIG. 6 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160*b*, and WDs 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
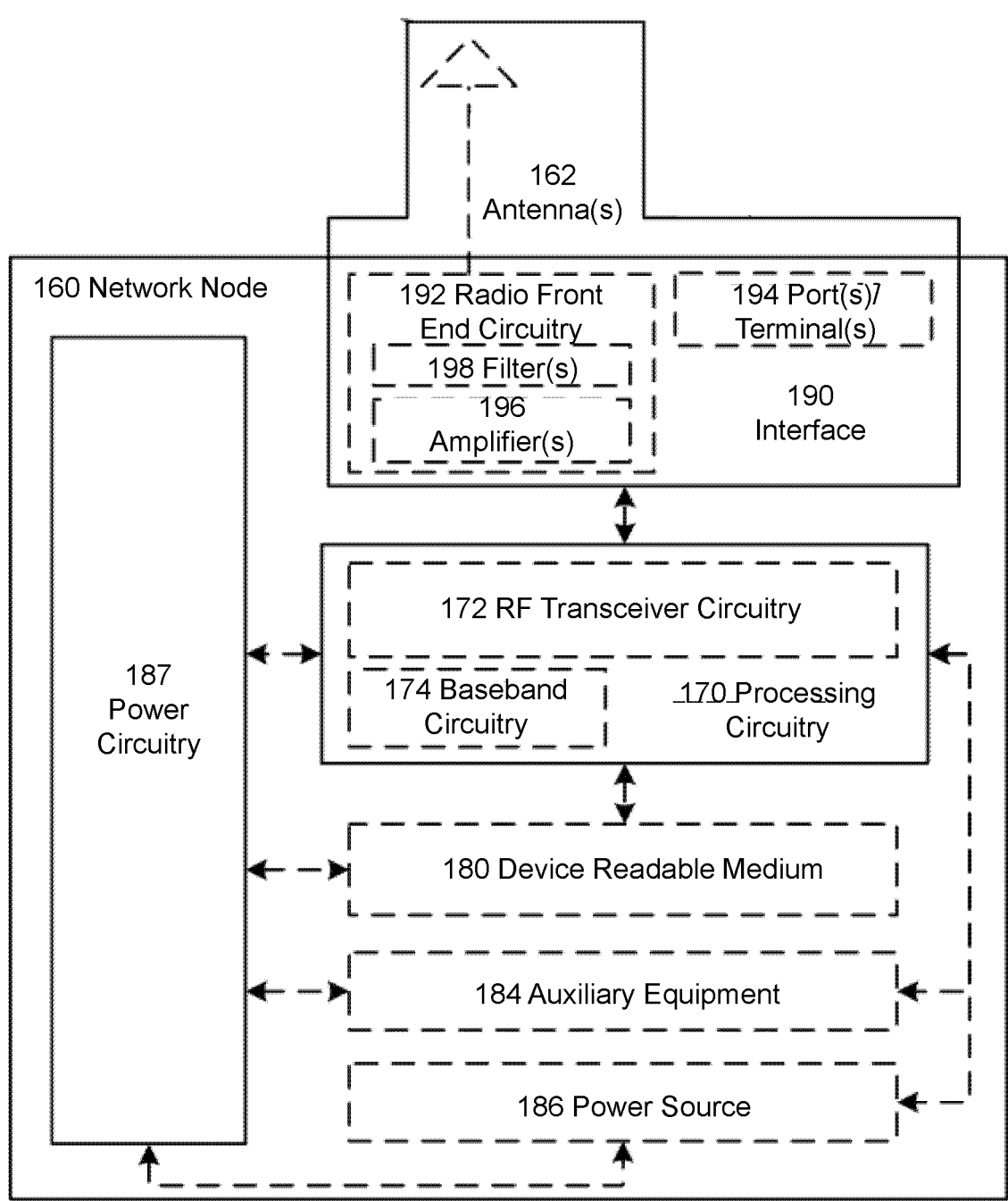
FIG. 7 illustrates an example network node, according to certain embodiments.

FIG. 7 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises ports)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
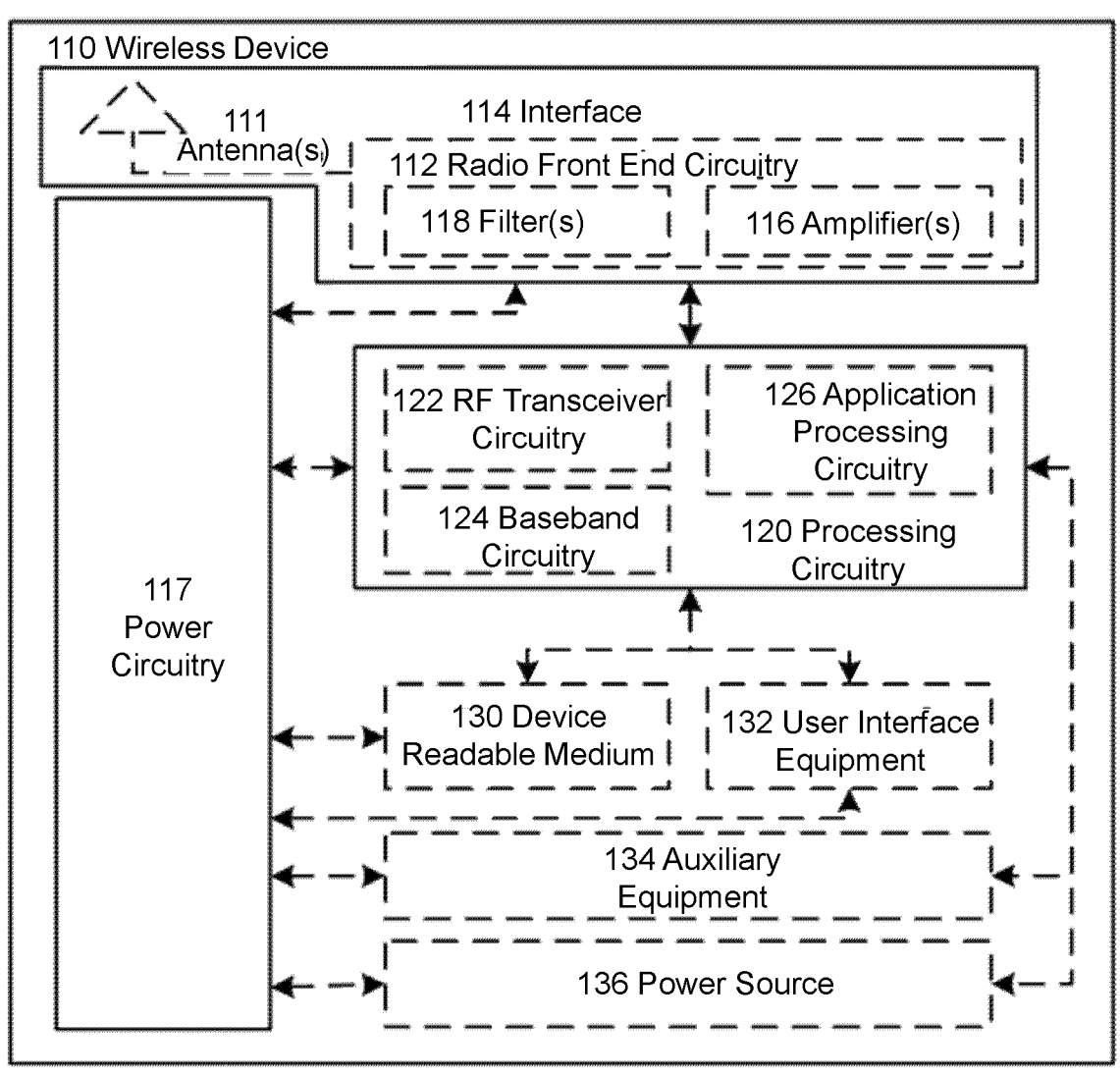
FIG. 8 illustrates an example wireless device, according to certain embodiments.

FIG. 8 illustrates an example wireless device (WD) 110, according to certain embodiments. As used herein, WD refers to a device capable, configured, arranged and/or operable to communicate wirelessly with network nodes and/or other wireless devices. Unless otherwise noted, the term may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support deviceto-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments. the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 9:
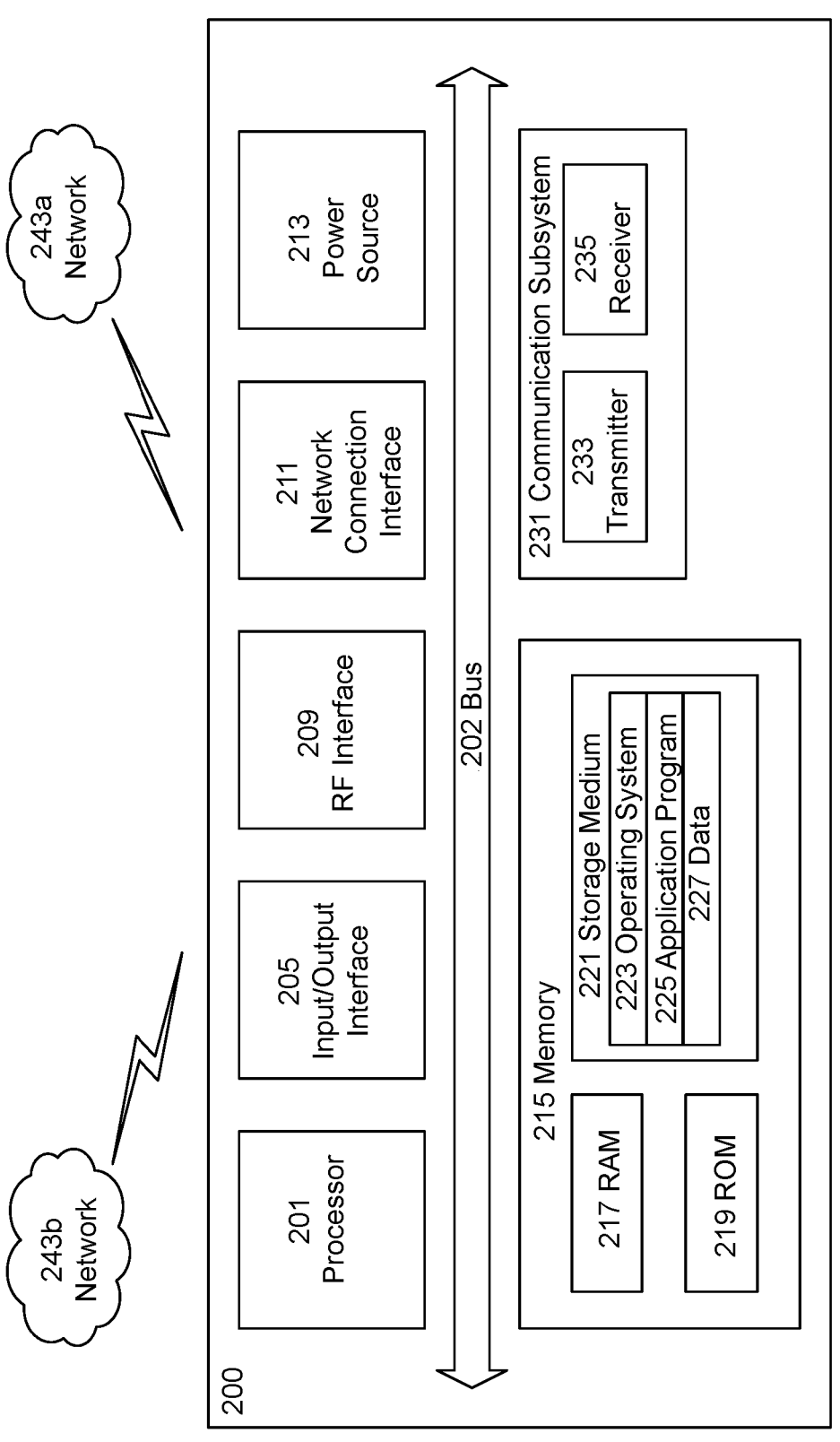
FIG. 9 illustrate an example user equipment, according to certain embodiments.

FIG. 9 illustrates one embodiment of a UE, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243_a_. Network 243_a_ may encompass wired and/or wireless networks such as a local-area network (LAN), a wide-area network (WAN), a computer network, a wireless network, a telecommunications network, another like network or any combination thereof. For example, network 243_a_ may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243_b_ using communication subsystem 231. Network 243_a_ and network 243_b_ may be the same network or networks or different network or networks. Communication subsystem 231 may be configured to include one or more transceivers used to communicate with network 243_b_. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243_b_ may encompass wired and/or wireless networks such as a local-area network (LAN), a wide-area network (WAN), a computer network, a wireless network, a telecommunications network, another like network or any combination thereof. For example, network 243_b_ may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
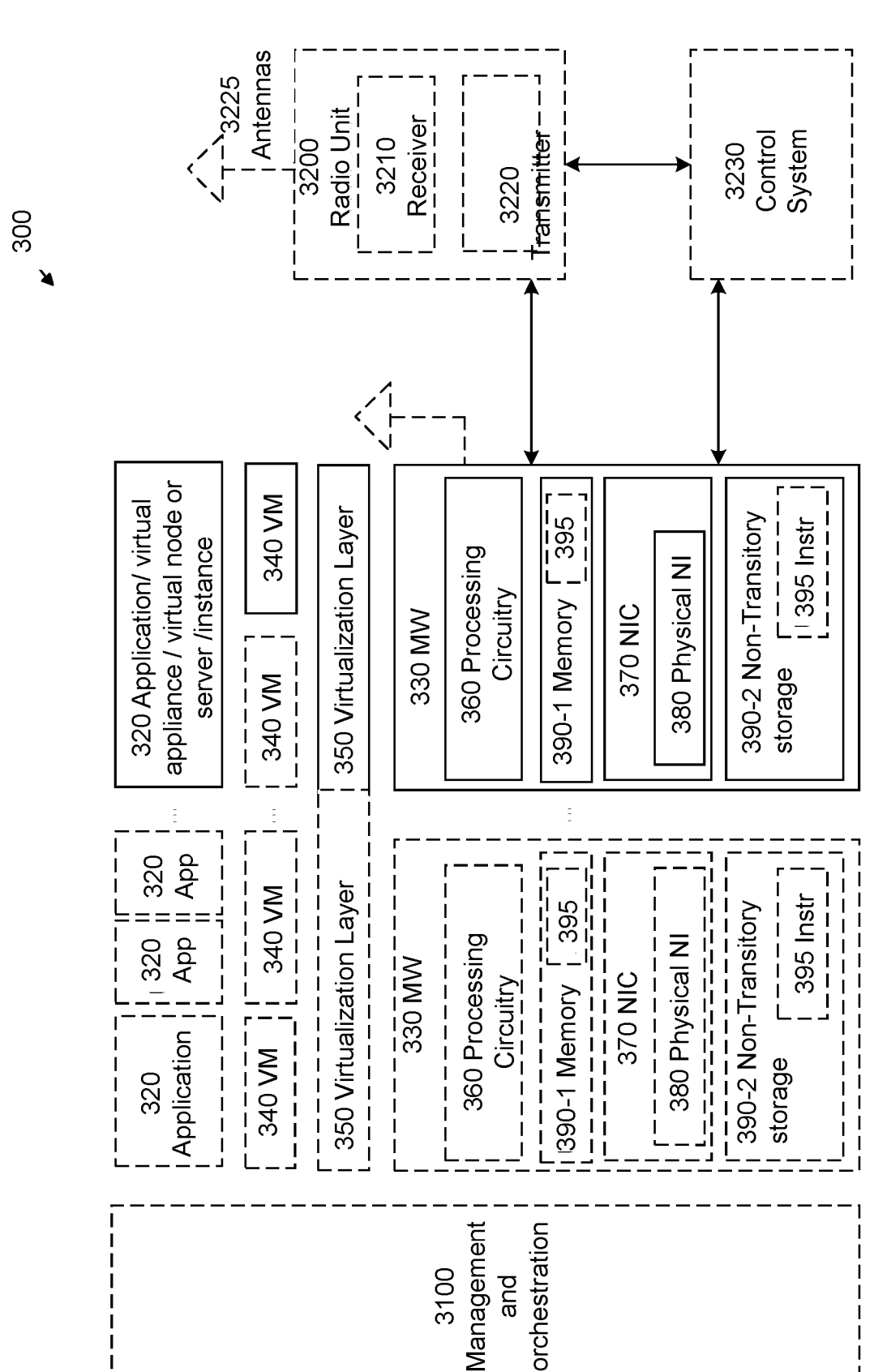
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

FIG. 11 illustrates a method 400 performed by a wireless device 110 for CPC. The method begins at step 402 with the wireless device 110 receiving, from a network node 160 operating as a an RRC Reconfiguration message (which is referred to herein as a RRCReconfiguration) in a MN format. The RRCReconfiguration includes at least one conditional reconfiguration for the CPC. The conditional reconfiguration includes:

for the target candidate cell, another RRC Reconfiguration message (which is referred to herein as RRCReconfiguration*) in MN format and includes a MCG configuration, wherein the RRCReconfiguration* includes another RRC Reconfiguration message (which is referred to herein as RRCReconfiguration), and wherein the RRCReconfiguration includes a SCG configuration for the target candidate cell;

at least one execution condition for the CPC; and a conditional reconfiguration identity associated with the CPC for the target candidate cell.

At step 404, the wireless device 110 transmits, to the network node 160, a reconfiguration complete message.

In a particular embodiment, the wireless device 110 monitors at least one candidate cell for a fulfilment of the execution condition for the CPC. The at least one candidate cell has a physical cell identity matching a value indicated in an Information Element (IE), ServingCellConfigCommon, included in an IE, ReconfigurationWithSync, in the RRCReconfiguration message. The RRCReconfiguration message is set in an IE, nr-SCG, in an IE, condRRCReconfig.

In a particular embodiment, the wireless device 110 applies the RRCReconfiguration*. The wireless device 110 also applies the RRCReconfiguration** for the target candidate SN upon a fulfilment of an execution condition for the target candidate cell.

In a particular embodiment, the wireless device 110 generates a first reconfiguration complete message (which is referred to herein as RRCReconfigurationComplete). The wireless device 110** also generates a second reconfiguration complete message (which is referred to herein as RRCReconfigurationComplete*). The wireless device 110 sends the RRCReconfigurationComplete** and RRCReconfigurationComplete* messages to the first network node. The RRCReconfigurationComplete message indicates that the wireless device has applied the RRCReconfiguration generated by the target candidate SN, and the RRCReconfigurationComplete* message indicates that the wireless device has applied the RRCReconfiguration*. The RRCReconfiguration* includes a cell identity or a conditional reconfiguration identity for the cell for which conditional reconfiguration has been executed. In a particular embodiment, the RRCReconfigurationComplete** message is included within the RRCReconfigurationComplete* message.

In a particular embodiment, the wireless device performs a random access procedure with the target candidate SN.

In a particular embodiment, the conditional reconfiguration for the MCG comprises a measurement configuration associated with the conditional reconfiguration for CPC. The wireless device 110 applies the measurement configuration and sends a measurement report to the network node 160.

In a particular embodiment, the wireless device 110 is capable of operating in Multi-Radio Dual Connectivity.

In a particular embodiment, the conditional reconfiguration comprises information for a plurality of target cells, and each target cell has an associated RRCReconfiguration* and RRCReconfiguration**.

Figure 12:
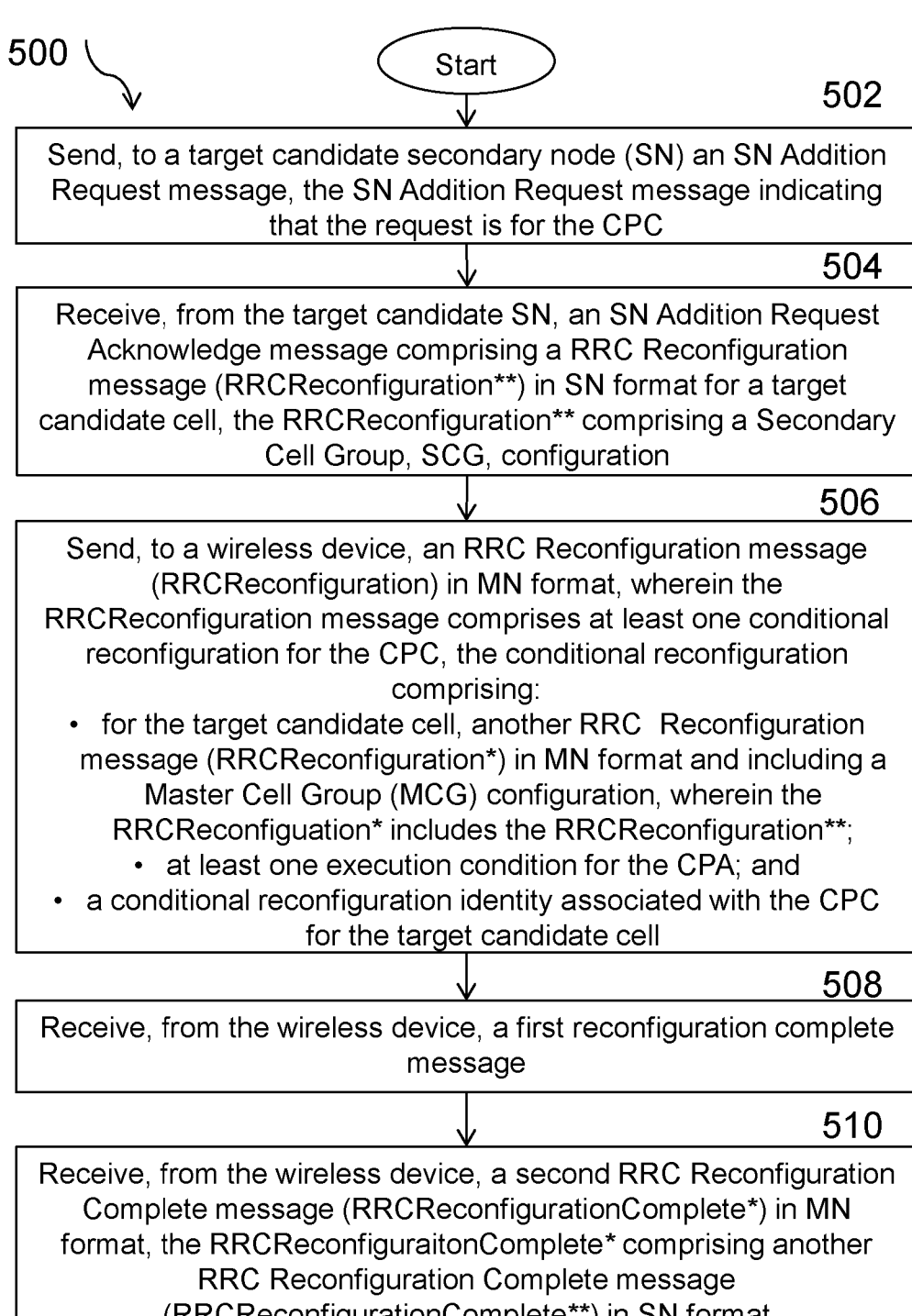
FIG. 12 illustrates an example method by a network node, according to certain embodiments.

FIG. 12 illustrates a method 500 performed by a first network node 160 operating as a MN for CPC, according to certain embodiments. The method begins at step 502 with the network node 160 sending, to a target candidate SN an SN Addition Request message. The SN Addition Request message indicates that the request is for the CPC.

At step 504, the network node 160 receives, from the target candidate SN, an SN Addition Request Acknowledge message comprising a RRC Reconfiguration message (which is referred to herein as RRCReconfiguration) in SN format for a target candidate cell. The RRCReconfiguration comprises a Secondary Cell Group (SCG) configuration.

At step 506, the network node 160 sends, to a wireless device 110, an RRC Reconfiguration message (which is referred to herein as RRCReconfiguration) in a MN format. The RRCReconfiguration message comprises at least one conditional reconfiguration for the CPC. The conditional reconfiguration includes:

for the target candidate cell, another RRC Reconfiguration message (which is referred to herein as RRCReconfiguration*) in MN format and includes a MCG configuration, wherein the RRCReconfiguration* includes another RRC Reconfiguration message (which is referred to herein as RRCReconfiguration), and wherein the RRCReconfiguration includes a SCG configuration for the target candidate cell;

at least one execution condition for the CPC; and a conditional reconfiguration identity associated with the CPC for the target candidate cell.

At step 508, the network node 160 receives, from the wireless device 110, a first reconfiguration complete message.

At step 510, the network node 160 receives, from the wireless device 110, a second reconfiguration complete message (which is referred to herein as RRCReconfigurationComplete*) in MN format. The RRCReconfigurationComplete* includes another RRCReconfigurationComplete message (which is referred to herein as RRCReconfigurationComplete**) in SN format. The RRCReconfigurationComplete* indicates that the wireless device applied the RRCReconfiguration* upon fulfilment of the execution condition. The RRCReconfigurationComplete indicates that the wireless device has applied the RRCReconfiguration and executed the CPC. A release of at least one source SN resource is delayed until the RRCReconfigurationComplete* is received by the network node.

In a particular embodiment, in response to receiving the RRCReconfigurationComplete indicating execution of CPC by the UE, the network node 160** transmits, to a source secondary node, a release message to confirm release of at least one source SN resource by the wireless device and receives, from the source SN, an acknowledgement message confirming release of the at least one source SN resource.

In a particular embodiment, in response to receiving the acknowledgement message confirming release of the at least one source SN resource, the network node 160 sends a reconfiguration complete message to the target candidate SN.

In a particular embodiment, the network node 160 reads the reconfiguration complete message from the wireless device 110.

In a particular embodiment, the conditional reconfiguration comprises information for a plurality of target cells, and each of the plurality of target cells having an associated RRCReconfiguration* and RRCReconfiguration**.

In a particular embodiment, the RRCReconfigurationComplete* includes a cell identity for one of the plurality of cells for which conditional reconfiguration has been executed. Additionally or alternatively, the RRCReconfigurationComplete* includes a conditional reconfiguration identity for the one of the plurality of cells for which conditional reconfiguration has been executed.

In a particular embodiment, the network node 160 maintains a mapping between the cell identity for the cell for which conditional reconfiguration has been executed and the target candidate SN ID of the target candidate SN that should receive the RRCReconfigurationComplete message. Additionally or alternatively, the network node 160 maintains a mapping between the conditional reconfiguration identity and the target candidate SN ID of the target candidate SN that should receive the RRCReconfiguration-Complete message.

In a particular embodiment, in response to receiving, from the wireless device, the RRCReconfigurationComplete* message including the RRCReconfigurationComplete message and the cell identity or the conditional reconfiguration identity, the network node 160 sends the RRCReconfigurationComplete message to the target candidate SN associated to the cell for which conditional reconfiguration has been executed.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

In certain embodiments, procedures for an MN-initiated CPC procedure with SN change (both preparation and execution phases) are disclosed. Methods in a wireless device (also referred to as a wireless terminal or a UE) capable of operating in MR-DC and in network nodes are also disclosed.

In certain embodiments, an MN determines to configure CPC for a UE operating in MR-DC. The MN includes an indication of conditional configuration (e.g., CPC indication) in an SN-NODE ADDITION REQUEST when the sends it to a target SN. The MN, upon reception of an SN-NODE ADDITION REQUEST ACKNOWLEDGE message, delays (until the confirmation of CPC execution from the UE) the transmission of at least one of the following messages: SN Release Request to the S-SN and Xn-U Address Indication. In other words, in certain embodiments the MN does not release the source SN when the UE is monitoring the conditions for CPC.

In certain embodiments, the MN builds/generates an RRC message (in MN format), for example RRCReconfiguration, that is sent to the UE, containing conditional reconfiguration and possibly including a measurement configuration associated to a conditional reconfiguration (e.g., CPC). The conditional reconfiguration for each target candidate may include at least one of the following:

a configuration for the associated execution condition (e.g., one or a number of measurement identifiers associated to a measurement configuration, such as an MCG measurement configuration);

another RRC Reconfiguration message in MN format generated by the MN (e.g., RRCReconfiguration*) that includes an SCG RRC Reconfiguration received from a Target candidate SN (e.g., provided as an nr-SCG set to RRCReconfiguration**). For example, the messages and IEs could be nested as follows:

RRC Reconfiguration (MN format);
Conditional Reconfiguration;
RRCReconfiguration* (MN format);
nr-SCG set to RRCReconfiguration** (SN format).

To summarize, in certain embodiments, the RRC message (RRCReconfiguration in MN format) contains conditions set by the MN, and the conditional reconfiguration including per candidate another RRC Reconfiguration in MN format (RRCReconfiguration*), where within there is as nr-SCG another RRC message built by the target SN (RRCReconfiguration**).

In certain embodiments, the RRCReconfiguration* in MN format is the message applied by the UE upon fulfilment of the execution condition for a given target candidate. As that contains within an RRCReconfiguration** message in SN format, that is also applied upon fulfilment of the conditions. As both messages in MN and SN format are applied, the UE generates two complete messages upon CPC execution and transmits an RRCReconfigurationComplete* in MN format to MN, including within an RRCReconfigurationComplete** in SN format. The latter is then forwarded form the to the target SN for which CPC has been executed.

In certain embodiments, the MN sends the RRC message (RRCReconfiguration) with the conditional reconfiguration to the UE.

In certain embodiments, the MN receives a first RRCReconfigurationComplete message when the UE is configured with CPC (without any SCG associated complete message) and, at CPC execution, a second RRC complete message (e.g., an RRCReconfigurationComplete* associated with the MN including within an SCG associated RRCReconfigurationComplete*), to be forwarded to the SN. The MN may either: forward the RRCReconfigurationComplete message to the target SN or send an S-NODE RECONFIGURATION COMPLETE to the target SN.

For example, according to one example embodiment, a method performed by a wireless device for conditional PSCell change is disclosed. The method by the wireless device includes receiving, from a first network node operating as a MN, a Radio Resource Control Reconfiguration message (RRCReconfiguration), the RRCReconfiguration message including at least one conditional reconfiguration. The method comprises configuring the at least one conditional reconfiguration. The method further includes sending, to the first network node, a reconfiguration complete message.

In certain embodiments, the RRCReconfiguration may be in MN format.

In certain embodiments, the conditional reconfiguration may include an RRCReconfiguration (RRCReconfiguration*) in MN format for a target candidate secondary node (SN) and at least one execution condition associated with the conditional reconfiguration. In certain embodiments, the RRCReconfiguration* comprises an RRC reconfiguration message generated by the target candidate SN (RRCReconfiguration**) in SN format.

In certain embodiments, the method by the wireless device may further include monitoring for the at least one execution condition. In certain embodiments, monitoring for the at least one execution condition may include determining a cell to be monitored for the at least one execution condition based on a physical cell identity matching a value indicated in a ServingCellConfigCommon included in a reconfigurationWithSync in an nr-SCG receiving in the conditional reconfiguration.

In certain embodiments, the method by the wireless device may include determining that the at least one execution condition has been fulfilled. In certain embodiments, the method may include applying the RRCReconfiguration*. In certain embodiments, the method may include applying the RRCReconfiguration** for the target candidate SN.

In certain embodiments, the method by the wireless device may include generating a RRCReconfigurationComplete message (RRCReconfigurationComplete**); generating a second RRCReconfigurationComplete message (RRCReconfigurationComplete*); and sending the RRCReconfigurationComplete** and RRCReconfigurationComplete* messages to the first network node. In certain embodiments, the RRCReconfigurationComplete message may indicate that the wireless device has applied the RRCReconfiguration generated by the target candidate SN. In certain embodiments, the RRCReconfigurationComplete** message may be included within the RRCReconfigurationComplete* message.

In certain embodiments, the method by the wireless device may include performing a random access procedure with the target candidate SN.

In certain embodiments, the conditional reconfiguration may comprise a measurement configuration associated with the conditional reconfiguration. In certain embodiments, the method by the wireless device may include applying the measurement configuration. In certain embodiments, the method may include sending a measurement report to the first network node.

In certain embodiments, the wireless device may be capable of operating in Multi-Radio Dual Connectivity.

In certain embodiments, the method by the wireless device may further include providing user data and forwarding the user data to a host computer via the transmission to the base station.

According to another example embodiment, a method performed by a first network node for conditional PSCell change is disclosed. In certain embodiments, the first network node may be operating as a N). The method by the network node includes determining to configure conditional PSCell change for a wireless device. The method by the network node generating an RRC Reconfiguration message (RRCReconfiguration) for the wireless device, and the RRCReconfiguration message comprises at least one conditional reconfiguration and an execution condition. The conditional reconfiguration includes, for a target candidate secondary node (SN), another RRC Reconfiguration in MN format (RRCReconfiguration*) generated by the and the RRCReconfiguration* includes an RRC Reconfiguration generated by the target candidate SN (RRCReconfiguration**) in SN format. The method by the network node includes sending the generated RRC Reconfiguration message to the wireless device.

In certain embodiments, the method by the network node may include sending, to the target candidate SN, an S-Node Addition Request message that indicates that the request is for conditional PSCell change and receiving, from the target candidate SN, an S-Node Addition Request Acknowledge message. The S-Node Addition Request Acknowledge message includes the RRCReconfiguration** generated by the target candidate SN.

In certain embodiments, the method by the network node may include receiving, from the wireless device, a reconfiguration complete message.

In certain embodiments, the method by the network node may include receiving a first RRCReconfigurationComplete message (RRCReconfigurationComplete**) and a second RRCReconfigurationComplete message (RRCReconfigurationComplete*) from the wireless device. In certain embodiments, the RRCReconfigurationComplete message may indicate that the wireless device has applied the RRCReconfiguration generated by the target candidate SN. In certain embodiments, the RRCReconfigurationComplete** message may be included within the RRCReconfigurationComplete* message.

In certain embodiments, the method by the network node may include, in response to receiving the RRCReconfigurationComplete** and RRCReconfigurationComplete* messages from the wireless device, sending a message to a source SN to confirm a release of source SN resources. In certain embodiments, the method by the network node may include receiving a message from the source SN confirming the release of the source SN resources.

In certain embodiments, the method by the network node may include sending a reconfiguration complete message to the target candidate SN.

In certain embodiments, the method by the network node may include receiving status information from the source SN and forwarding the status information to the target candidate SN.

In certain embodiments, the method by the network node may include forwarding late data to the target candidate SN.

In certain embodiments, the conditional reconfiguration includes information for a plurality of target cells, and each target cell may have an associated RRCReconfiguration* and RRCReconfiguration**.

In certain embodiments, the method by the network node may include obtaining user data and forwarding the user data to a host computer or a wireless device.

According to certain embodiments, a computer program is provided, which includes instructions that, when executed on a computer, perform any one of the methods described above.

According to certain embodiments, a computer program product includes a computer program that includes instructions which when executed on a computer perform any one of the methods described above.

According to certain embodiments, a computer storage medium includes a computer program, which includes instructions that, when executed on a computer, perform any of the methods described above.

According to certain embodiments, a computer storage carrier includes a computer program, which includes instructions that, when executed on a computer, perform any one of the methods described above.

The invention claimed is:

1. A method performed by a network node for Conditional Primary Secondary Cell (PSCell) Change, CPC, the first network node operating as a Master Node, MN, the method comprising:

sending, to a target candidate secondary node, SN, an SN Addition Request message, the SN Addition Request message indicating that the request is for the CPC;

receiving, from the target candidate SN, an SN Addition Request Acknowledge message comprising a RRC Reconfiguration message, RRCReconfiguration, in SN format for a target candidate cell, the RRCReconfiguration comprising a Secondary Cell Group, SCG, configuration;

sending, to a wireless device, an RRC Reconfiguration message, RRCReconfiguration, in a MN format, wherein the RRCReconfiguration message comprises at least one conditional reconfiguration for the CPC, the conditional reconfiguration comprising:

for the target candidate cell, another RRC Reconfiguration message, RRCReconfiguration*, in MN format and including a Master Cell Group (MCG) configuration, wherein the RRCReconfiguration* includes the RRCReconfiguration**; and at least one execution condition for the CPC; and a conditional reconfiguration identity associated with the CPC for the target candidate cell;

receiving, from the wireless device, a first reconfiguration complete message;

receiving, from the wireless device, a second RRCReconfigurationComplete message, RRCReconfiguration-Complete*, in MN format, the RRCReconfiguration-Complete* comprising another RRCReconfigurationComplete message, RRCReconfigurationComplete**, in SN format, and wherein:

the RRCReconfigurationComplete* indicates that the wireless device applied the RRCReconfiguration* upon fulfilment of the execution condition, the RRCReconfigurationComplete indicates that the wireless device has applied the RRCReconfiguration and executed the CPC, and a release of at least one source SN resource is delayed until the RRCReconfigurationComplete* is received by the network node.

2. The method of claim 1, further comprising:

in response to receiving the RRCReconfigurationComplete** indicating execution of CPC by the UE, transmitting, to a source secondary node, a release message to confirm release of at least one source SN resource by the wireless device; and receiving, from the source SN, an acknowledgement message confirming release of the at least one source SN resource.

3. The method of claim 2, further comprising:

in response to receiving the acknowledgement message confirming release of the at least one source SN resource, sending a reconfiguration complete message to the target candidate SN.

4. A method performed by a wireless device for Conditional Primary Secondary Cell (PSCell) Change, CPC, the method comprising:

receiving, from a network node operating as a Master Node, MN, an RRC Reconfiguration message, RRCReconfiguration, in a MN format, wherein the RRCReconfiguration comprises at least one conditional reconfiguration for the CPC, the conditional reconfiguration comprising:

for the target candidate cell, another RRC Reconfiguration message, RRCReconfiguration*, in MN format and including a Master Cell Group (MCG) configuration, wherein the RRCReconfiguration* includes another RRC Reconfiguration message, RRCReconfiguration**, the RRCReconfiguration comprising a Secondary Cell Group (SCG) configuration for a target candidate cell; and at least one execution condition for the CPC; and a conditional reconfiguration identity associated with the CPC for the target candidate cell; and transmitting, to the network node, a first reconfiguration complete message;

transmitting, to the network node, a second RRCReconfigurationComplete message, RRCReconfiguration-Complete*, in MN format, the RRCReconfiguration-Complete* comprising another RRCReconfigurationComplete message, RRCReconfigurationComplete**, in secondary node, SN, format, and wherein:

the RRCReconfigurationComplete* indicates that the wireless device applied the RRCReconfiguration* upon fulfilment of the execution condition, the RRCReconfigurationComplete indicates that the wireless device has applied the RRCReconfiguration and executed the CPC, and a release of at least one source SN resource is delayed until the RRCReconfigurationComplete* is received by the network node.

5. A network node operating as a Master Node, MN, during Conditional Primary Secondary Cell (PSCell) Change, CPC, the network node comprising:

processing circuitry configured to:

send, to a target candidate secondary node, SN, an SN Addition Request message, the SN Addition Request message indicating that the request is for the CPC;

receive, from the target candidate SN, an SN Addition Request Acknowledge message comprising a RRC Reconfiguration message, RRCReconfiguration, in SN format for a target candidate cell, the RRCReconfiguration comprising a Secondary Cell Group, SCG, configuration;

send, to a wireless device, an RRC Reconfiguration message, RRCReconfiguration, in a MN format, wherein the RRCReconfiguration message comprises at least one conditional reconfiguration for the CPC, the conditional reconfiguration comprising:

for the target candidate cell, another RRC Reconfiguration message, RRCReconfiguration*, in MN format and including a Master Cell Group (MCG) configuration, wherein the RRCReconfiguration* includes the RRCReconfiguration** and at least one execution condition for the CPC; and a conditional reconfiguration identity associated with the CPC for the target candidate cell;

receive, from the wireless device, a first reconfiguration complete message;

receive, from the wireless device, a second RRCReconfigurationComplete message, RRCReconfiguration-Complete*, in MN format, the RRCReconfiguration-Complete* comprising another RRCReconfigurationComplete message, RRCReconfigurationComplete**, in SN format, and wherein:

the RRCReconfigurationComplete* indicates that the wireless device applied the RRCReconfiguration* upon fulfilment of the execution condition, the RRCReconfigurationComplete indicates that the wireless device has applied the RRCReconfiguration and executed the CPC, and a release of at least one source SN resource is delayed until the RRCReconfigurationComplete* is received by the network node.

6. The network node of claim 5, wherein the processing circuitry is configured to:

in response to receiving the RRCReconfigurationComplete** indicating execution of CPC by the UE, transmit, to a source secondary node, a release message to confirm release of at least one source SN resource by the wireless device; and receive, from the source SN, an acknowledgement message confirming release of the at least one source SN resource.

7. The network node of claim 6, wherein the processing circuitry is configured to:

in response to receiving the acknowledgement message confirming release of the at least one source SN resource, send a reconfiguration complete message to the target candidate SN.

8. The network node of claim 5, wherein the processing circuitry is configured to:

receiving the reconfiguration complete message from the wireless device.

9. The network node of claim 5, wherein the conditional reconfiguration comprises information for a plurality of target cells, each of the plurality of target cells having an associated RRCReconfiguration* and RRCReconfiguration**.

10. The network node of claim 5, wherein the RRCReconfigurationComplete* comprises:

a cell identity for one of the plurality of cells for which conditional reconfiguration has been executed; or a conditional reconfiguration identity for the one of the plurality of cells for which conditional reconfiguration has been executed.

11. The network node of 10, wherein the processing circuitry is configured to:

maintain a mapping between the cell identity for the cell for which conditional reconfiguration has been executed and the target candidate SN ID of the target candidate SN that should receive the RRCReconfigurationComplete message, or maintain a mapping between the conditional reconfiguration identity and the target candidate SN ID of the target candidate SN that intended to receive the RRCReconfigurationComplete message.

12. The network node of claim 11, wherein the processing circuitry is configured to:

in response to receiving, from the wireless device, the RRCReconfigurationComplete* message comprising the RRCReconfigurationComplete** message and the cell identity or the conditional reconfiguration identity, send the RRCReconfigurationComplete* message to the target candidate SN associated to the cell for which conditional reconfiguration has been executed.

13. A wireless device for Conditional Primary Secondary Cell (PSCell) Change, CPC, the wireless device comprising:

processing circuitry configured to:

receive, from a network node operating as a Master Node, MN, an RRC Reconfiguration message, RRCReconfiguration, in a MN format, wherein the RRCReconfiguration comprises at least one conditional reconfiguration for the CPC, the conditional reconfiguration comprising:

for the target candidate cell, another RRC Reconfiguration message, RRCReconfiguration*, in MN format and including a Master Cell Group (MCG) configuration, wherein the RRCReconfiguration* includes another RRC Reconfiguration message, RRCReconfiguration**, the RRCReconfiguration comprising a Secondary Cell Group (SCG) configuration for a target candidate cell; and at least one execution condition for the CPC; and a conditional reconfiguration identity associated with the CPC for the target candidate cell; and transmit, to the network node, a first reconfiguration complete message;

transmit, to the network node, a second RRCReconfigurationComplete message, RRCReconfigurationComplete*, in MN format, the RRCReconfigurationComplete* comprising another RRCReconfigurationComplete message, RRCReconfigurationComplete**, in secondary node, SN, format, and wherein:

the RRCReconfigurationComplete* indicates that the wireless device applied the RRCReconfiguration* upon fulfilment of the execution condition, the RRCReconfigurationComplete indicates that the wireless device has applied the RRCReconfiguration and executed the CPC, and a release of at least one source SN resource is delayed until the RRCReconfigurationComplete* is received by the network node.

14. The wireless device of claim 13, wherein the processing circuitry is configured to:

monitor at least one candidate cell for a fulfilment of the execution condition for the CPC, and wherein the at least one candidate cell has a physical cell identity matching a value indicated in an Information Element, IE, ServingCellConfigCommon, included in an IE ReconfigurationWithSync in the RRCReconfiguration message, and wherein the RRCReconfiguration message is set in an IE, nr-SCG, in an IE, condRRCReconfig.

15. The wireless device of claim 13, wherein the processing circuitry is configured to:

apply the RRCReconfiguration*, and apply the RRCReconfiguration** for a target candidate SN upon a fulfilment of an execution condition for the target candidate cell.

16. The wireless device of claim 13, wherein the processing circuitry is configured to:

generate a first reconfiguration complete message, RRCReconfigurationComplete**;

generate a second reconfiguration complete message, RRCReconfigurationComplete*; and send the RRCReconfigurationComplete** and RRCReconfigurationComplete* messages to the first network node, and wherein the RRCReconfigurationComplete message indicates that the wireless device has applied the RRCReconfiguration generated by a target candidate SN, and wherein the RRCReconfigurationComplete* message indicates that the wireless device has applied the RRCReconfiguration* and includes a cell identity for the cell for which conditional reconfiguration has been executed or a conditional reconfiguration identity for the cell for which conditional reconfiguration has been executed, and wherein the RRCReconfigurationComplete** message is included within the RRCReconfigurationComplete* message.

17. The wireless device of claim 13, wherein the processing circuitry is configured to:

perform a random access procedure with a target candidate SN.

18. The wireless device of claim 13, wherein the conditional reconfiguration for the MCG comprises a measurement configuration associated with the conditional reconfiguration for CPC, and wherein the processing circuitry is configured to:

apply the measurement configuration; and send a measurement report to the network node.

19. The wireless device of claim 13, wherein the wireless device is capable of operating in Multi-Radio Dual Connectivity.

20. The wireless device of claim 13, wherein the conditional reconfiguration comprises information for a plurality of target cells, each target cell having an associated RRCReconfiguration* and RRCReconfiguration**.

\* \* \* \* \*